(12) United States Patent
Newman et al.

(10) Patent No.: US 12,166,620 B2
(45) Date of Patent: Dec. 10, 2024

(54) EFFICIENT AI METHODS FOR LOCALIZATION OF FAULTED MESSAGE ELEMENTS IN 5G/6G

(71) Applicants: David E. Newman, Poway, CA (US); R. Kemp Massengill, Palos Verdes, CA (US)

(72) Inventors: David E. Newman, Poway, CA (US); R. Kemp Massengill, Palos Verdes, CA (US)

(*) Notice: Subject to any disclaimer, the term of this patent is extended or adjusted under 35 U.S.C. 154(b) by 0 days.

(21) Appl. No.: 18/751,270

(22) Filed: Jun. 23, 2024

(65) Prior Publication Data

US 2024/0348484 A1 Oct. 17, 2024

Related U.S. Application Data

(63) Continuation of application No. 18/199,399, filed on May 19, 2023, now Pat. No. 12,047,220, which is a
(Continued)

(51) Int. Cl.
*H04L 27/26* (2006.01)
*H04L 1/00* (2006.01)
(Continued)

(52) U.S. Cl.
CPC ........ *H04L 27/2691* (2013.01); *H04L 1/0003* (2013.01); *H04L 1/0019* (2013.01); *H04L 1/0045* (2013.01); *H04L 1/0047* (2013.01); *H04L 1/0061* (2013.01); *H04L 1/08* (2013.01); *H04L 1/1607* (2013.01); *H04L 1/1809* (2013.01); *H04L 1/20* (2013.01); *H04L 1/201* (2013.01); *H04L 1/206* (2013.01); *H04L 27/02* (2013.01); *H04L 27/2614* (2013.01);
(Continued)

(58) Field of Classification Search
CPC ..... H04L 27/34; H04L 27/2691; H04L 1/206; H04L 1/0003; H04W 28/04
See application file for complete search history.

(56) References Cited

U.S. PATENT DOCUMENTS 8,059,763 B1 11/2011 Varnica
2007/0089036 A1 4/2007 Jiang
(Continued)

*Primary Examiner* — Rahel Guarino

(57) ABSTRACT

In 5G-Advanced and especially 6G, a primary concern is the increase in message faulting due to higher pathloss and phase noise at FR2 frequencies. Current methods for dealing with faults include packing the message with bulky error-correction (FEC) bits which are often ineffective, or automatically requesting a costly retransmission. As a substantially better alternative, the receiver may identify the specific fault locations and attempt an immediate repair by testing the modulation quality of each message element. For example, for a QAM-modulated message, the receiver can measure the I and Q branch deviations relative to predetermined levels, and the message element(s) with largest deviations is/are likely faulted. Alternatively, if the message is advantageously modulated according to the waveform amplitude and phase, the receiver can determine the amplitude and phase deviations relative to predetermined values. An AI model can greatly assist in the fault localization and in finding the corrected values.

20 Claims, 13 Drawing Sheets

Related U.S. Application Data continuation of application No. 18/070,866, filed on Nov. 29, 2022, now Pat. No. 11,695,612, which is a continuation of application No. 17/851,753, filed on Jun. 28, 2022, now Pat. No. 11,522,745, which is a continuation of application No. 17/675,221, filed on Feb. 18, 2022, now Pat. No. 11,411,795.

(60) Provisional application No. 63/310,364, filed on Feb. 15, 2022, provisional application No. 63/310,240, filed on Feb. 15, 2022, provisional application No. 63/309,748, filed on Feb. 14, 2022, provisional application No. 63/309,750, filed on Feb. 14, 2022, provisional application No. 63/282,770, filed on Nov. 24, 2021, provisional application No. 63/281,847, filed on Nov. 22, 2021, provisional application No. 63/281,187, filed on Nov. 19, 2021, provisional application No. 63/280,281, filed on Nov. 17, 2021, provisional application No. 63/230,926, filed on Aug. 9, 2021, provisional application No. 63/159,195, filed on Mar. 10, 2021, provisional application No. 63/159,238, filed on Mar. 10, 2021, provisional application No. 63/157,090, filed on Mar. 5, 2021, provisional application No. 63/151,270, filed on Feb. 19, 2021.

(51) Int. Cl.
| | | |
|---|---|---|
| *H04L 1/08* | (2006.01) | |
| *H04L 1/1607* | (2023.01) | |
| *H04L 1/1809* | (2023.01) | |
| *H04L 1/20* | (2006.01) | |
| *H04L 27/02* | (2006.01) | |
| *H04L 27/34* | (2006.01) | |
| *H04L 27/36* | (2006.01) | |
| *H04W 28/04* | (2009.01) | |

(52) U.S. Cl.
CPC ............ *H04L 27/34* (2013.01); *H04L 27/364* (2013.01); *H04W 28/04* (2013.01)

(56) References Cited

U.S. PATENT DOCUMENTS

| | | | |
|---|---|---|---|
| 2007/0089037 | A1 | 4/2007 | Jiang |
| 2008/0123788 | A1 | 5/2008 | Wongwirawat |
| 2009/0046771 | A1 | 2/2009 | Abe |
| 2010/0097939 | A1 | 4/2010 | Yoneta |
| 2012/0311409 | A1 | 12/2012 | Pedersen |
| 2013/0163656 | A1 | 6/2013 | Sakamoto |
| 2013/0346826 | A1 | 12/2013 | Zopf |
| 2014/0056342 | A1 | 2/2014 | Baker |
| 2014/0376358 | A1 | 12/2014 | Eder |
| 2015/0139350 | A1 | 5/2015 | Sugihara |
| 2016/0080109 | A1 | 3/2016 | Lee |
| 2017/0019210 | A1* | 1/2017 | Yu ........................ H04L 1/007 |
| 2017/0134193 | A1 | 5/2017 | Sugihara |
| 2017/0288912 | A1 | 10/2017 | Rahmati |
| 2017/0311300 | A1 | 10/2017 | Stanwood |
| 2017/0331734 | A1 | 11/2017 | Cariou |
| 2019/0102244 | A1 | 4/2019 | Tarlano |
| 2020/0348662 | A1 | 11/2020 | Cella |
| 2020/0364545 | A1* | 11/2020 | Shattil ..................... G06N 3/08 |
| 2020/0366409 | A1 | 11/2020 | Xu |
| 2020/0394090 | A1 | 12/2020 | Urban |
| 2021/0250049 | A1 | 8/2021 | Gabrys |
| 2021/0273651 | A1 | 9/2021 | Haftbaradaran |
| 2021/0328598 | A1 | 10/2021 | Annamraju |
| 2021/0377763 | A1 | 12/2021 | Tian |
| 2021/0383207 | A1 | 12/2021 | Beery |

\* cited by examiner

EFFICIENT AI METHODS FOR LOCALIZATION OF FAULTED MESSAGE ELEMENTS IN 5G/6G

PRIORITY CLAIMS AND RELATED APPLICATIONS

This application is a continuation of U.S. patent application Ser. No. 18/199,399, entitled "AI-Based Correction of Corrupted 5G/6G Messages", filed May 19, 2023, which is a continuation of U.S. patent application Ser. No. 18/070,866, entitled "Method to Locate Faulted Message Elements Using AI in 5G and 6G", filed Nov. 29, 2022, which is a continuation of U.S. patent application Ser. No. 17/851,753, entitled "Identification and Mitigation of Message Faults in 5G and 6G Communications", filed Jun. 28, 2022, which is a continuation of U.S. patent application Ser. No. 17/675,221, entitled "Artificial-Intelligence Error Mitigation in 5G/6G Messaging", filed Feb. 18, 2022, which claims the benefit of U.S. Provisional Patent Application Ser. No. 63/151,270, entitled "Wireless Modulation for Mitigation of Noise and Interference", filed Feb. 19, 2021, and U.S. Provisional Patent Application Ser. No. 63/157,090, entitled "Asymmetric Modulation for High-Reliability 5G Communications", filed Mar. 5, 2021, and U.S. Provisional Patent Application Ser. No. 63/159,195, entitled "Asymmetric Modulation for High-Reliability 5G Communications", filed Mar. 10, 2021, and U.S. Provisional Patent Application Ser. No. 63/159,238, entitled "Selecting a Modulation Table to Mitigate 5G Message Faults", filed Mar. 10, 2021, and U.S. Provisional Patent Application Ser. No. 63/230,926, entitled "Error Detection and Correction in 5G by Modulation Quality", filed Aug. 9, 2021, and U.S. Provisional Patent Application Ser. No. 63/280,281, entitled "Error Detection and Correction in 5G by Modulation Quality in 5G/6G", filed Nov. 17, 2021, and US Provisional Patent Application Ser. No. 63/281,187, entitled "Error Correction by Merging Copies of 5G/6G Messages", filed Nov. 19, 2021, and U.S. Provisional Patent Application Ser. No. 63/281,847, entitled "Retransmission of Selected Message Portions in 5G/6G", filed Nov. 22, 2021, and U.S. Provisional Patent Application Ser. No. 63/282,770, entitled "AI-Based Error Detection and Correction in 5G/6G Messaging", filed Nov. 24, 2021, and U.S. Provisional Patent Application Ser. No. 63/309,748, entitled "Error Detection and Correction in 5G/6G Pulse-Amplitude Modulation", filed Feb. 14, 2022, and U.S. Provisional Patent Application Ser. No. 63/309,750, entitled "Error Correction by Merging Copies of PAM-Modulated 5G/6G Messages", filed Feb. 14, 2022, and U.S. Provisional Patent Application Ser. No. 63/310,240, entitled "Retransmission of Selected PAM-Modulated Message Portions in 5G/6G", filed Feb. 15, 2022, and U.S. Provisional Patent Application Ser. No. 63/310,364, entitled "Artificial-Intelligence Error Mitigation in 5G/6G Messaging", filed Feb. 15, 2022, all of which are hereby incorporated by reference in their entireties.

FIELD OF THE INVENTION

Disclosed are artificial intelligence-based systems and methods for detecting and correcting corrupted wireless messages.

BACKGROUND OF THE INVENTION

Due to noise or interference, wireless messages are often corrupted as-received, necessitating a time-consuming energy-consuming retransmission. However, the received message usually contains much valuable information. What is needed is a way to recover the original message without, or with minimal, need for retransmissions.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a method for a wireless receiver to identify faulted message elements, the method comprising: receiving a message comprising message elements, each message element comprising a resource element of a resource grid, modulated according to a modulation scheme comprising exactly two modulation parameters, wherein a first modulation parameter is modulated according to a first plurality of predetermined modulation levels and a second modulation parameter is modulated according to a second plurality of predetermined modulation levels; for each message element, determining a first deviation comprising a difference between a measured value of the first modulation parameter and a closest level of the first plurality of predetermined modulation levels, and determining a second deviation comprising a difference between a measured value of the second modulation parameter and a closest level of the second plurality of predetermined modulation levels; and determining which message elements are likely faulted according to the first and second deviations.

In another aspect, there is a wireless receiver comprising an artificial intelligence (AI) model, wherein: the wireless receiver is configured to receive wireless signals comprising message elements, each message element comprising a resource element of a resource grid modulated according to a modulation scheme comprising exactly two multiplexed modulation parameters comprising a first modulation parameter and a second modulation parameter; and the wireless receiver is further configured to provide, as input to the AI model, as-received values for the first and second modulation parameter of each message element, and to determine, as output from the AI model, which message element is likely faulted.

In another aspect, there is non-transitory computer-readable media in a wireless receiver, the non-transitory computer-readable media containing instructions that, when implemented by a computing environment, cause a method to be performed, the method comprising: receiving a wireless message comprising message elements, each message element comprising a resource element of a resource grid, each message element modulated according to a modulation scheme comprising exactly two multiplexed modulation parameters comprising a first modulation parameter and a second modulation parameter, wherein the first modulation parameter is modulated according to a first plurality of predetermined modulation levels and the second modulation parameter is modulated according to a second plurality of predetermined modulation levels; for each message element, measuring a first received value of the first modulation parameter and a second received value of the second modulation parameter; for each message element, determining a first deviation comprising a difference between the first received value and a closest predetermined modulation level of the first plurality, and determining a second deviation comprising a difference between the second received value and a closest predetermined modulation level of the second plurality; determining, according to the first or second deviation of a particular message element, that the particular message element is likely faulted.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

Like reference numerals refer to like elements throughout.

DETAILED DESCRIPTION

Figure 1A:
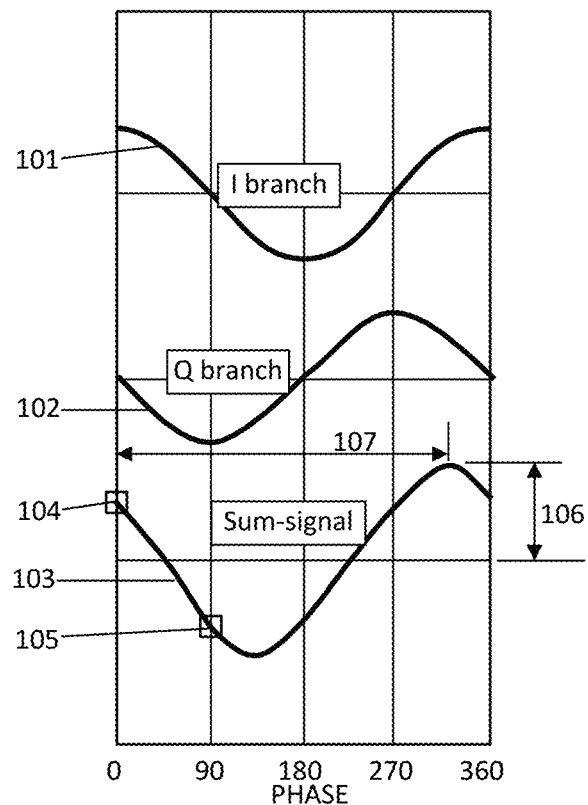
FIG. 1A is a chart showing exemplary embodiments of components of a PAM signal, according to some embodiments.

Disclosed herein are procedures for a wireless receiver to detect, localize, and correct individual errors in a received message using artificial intelligence, thereby enhancing reliability and minimizing retransmission delays. Systems and methods disclosed herein (the "systems" and "methods", also occasionally termed "embodiments" or "arrangements", generally according to present principles) can provide urgently needed wireless communication protocols to reduce retransmission burdens, improve reliability, and reduce overall delays in networks such as 5G and 6G networks, according to some embodiments. Commonly in wireless communication, interference or noise may distort one or more message elements, resulting in a corrupted message as received. Such a message is generally rejected by the receiving entity because the message disagrees with its error-detection code (EDC), such as a CRC (cyclic redundancy code) or a parity construct. Lack of an acknowledgement then prompts a retransmission, which takes extra time and extra signaling. However, the corrupted message contains a great deal of information despite the fault, especially if the fault is restricted to one or a few resource elements, and even the faulted message elements may contain valuable information to assist in error mitigation. For example, a message modulated according to PAM (pulse-amplitude modulation) may include one or more message elements with improper amplitude modulation, which may reveal the locations of message faults.

Procedures are disclosed for developing a predictive AI model for localizing faults to one or a few message elements, and optionally for directing subsequent mitigation based on input parameters such as the noise and interference background, information about the message and any retransmissions, any demodulation references proximate to the message, and optionally certain features that the receiving entity may anticipate in the message, for example. Also disclosed are methods for evaluating the modulation quality of each element of a message, and for merging a message with its retransmission to exclude the faulted message elements. The systems and methods disclosed herein can provide means for detecting one or more faulted resource elements in a message, and efficiently determining the correct value of those resource elements, thereby providing a low-latency and high-reliability solution to message fault problems, according to some embodiments.

Terms used herein generally follow 3GPP (Third Generation Partnership Project) usage, but with clarification where needed to resolve ambiguities. As used herein, "5G" represents fifth-generation and "6G" sixth-generation wireless technology. A network (or cell or LAN or local area network or the like) may include a base station (or gNB or generation-node-B or eNB or evolution-node-B or access point) in signal communication with a plurality of user devices (or UE or user equipment or nodes or terminals) and operationally connected to a core network (CN) which handles non-radio tasks, such as administration, and is usually connected to a larger network such as the Internet. "Receiver" is to be construed broadly, including processors accessible by the recipient of a message, and configured to perform calculations on received signals or messages. Embodiments may include direct user-to-user ("sidelink") communication such as V2V (vehicle-to-vehicle) communication, V2X (vehicle-to-anything), X2X (anything-to-anything, also called D2D or device-to-device) and base station communications or V2N (vehicle-to-network). "Vehicle" is to be construed broadly, including any mobile wireless communication device. The time-frequency space is generally configured as a "resource grid" including a number of "resource elements", each resource element being a specific unit of time termed a "symbol time", and a specific frequency and bandwidth termed a "subcarrier" (or "subchannel" in some references). Each subcarrier can be independently modulated to convey message information. Thus a resource element, spanning a single symbol in time and a single subcarrier in frequency, is the smallest unit of a message. "RNTI" (radio network temporary identity) or "C-RNTI" (cell radio network temporary identification) is a network-assigned user code. "QoS" is quality of service, or priority. "QCI" (QOS class identifier) defines various performance levels. "QPSK" (quad phase-shift keying) is a modulation scheme with two bits per message element, and "16QAM" (quadrature amplitude modulation with 16 states) is a modulation scheme with 4 bits per message element. "SNR" (signal-to-noise ratio) and "SINR" (signal-to-interference-and-noise ratio) are treated equivalently herein.

"PAM" (pulse-amplitude modulation, not to be confused with signal generation by rapid pulsatile energy bursts) is a message modulation technology in which bits of a message are allocated to two sinusoidal "branch" signals, which are then amplitude-modulated to encode the message bits, and then summed with a 90-degree phase offset, and transmitted. The receiver can then receive the transmitted signal, separate the two branch signals, and measure their amplitudes. The receiver can demodulate the message elements by separating the two branch signals, measuring their amplitudes, and comparing to a set of predetermined amplitude levels of the PAM modulation scheme. The branches may be termed the "real" and "imaginary" branches, or the "I and Q" (in-phase and quadrature-phase) branches. A "constellation table" is a chart showing the I and Q modulation states of a PAM modulation scheme.

The "sum-signal" is the as-received waveform before separating the branches, or equivalently, the sum of the two branches. Each of the I-branch and Q-branch signals may be amplitude modulated according to one of the predetermined amplitude levels. For example, 16QAM has two predetermined amplitude levels, such as +1 and +3 in some units, and their negatives. Each branch can then be amplitude modulated as −3, −1, +1, or +3, thereby representing four possible "branch amplitudes". Each message element includes two branches, each of which has four branch amplitude possibilities, thereby providing 4×4=16 total modulation states, as expected for 16QAM.

In addition to the 3GPP terms, the following terms are defined herein. Although in references a modulated resource element of a message may be referred to as a "symbol", this may be confused with the same term for a time interval, among other things. Therefore, each modulated resource element of a message is referred to as a "modulated message resource element", or more simply as a "message element", in examples below. A "demodulation reference" is a set of modulated resource elements that exhibit levels of a modulation scheme (as opposed to conveying data). A "calibration set" is one or more amplitude values, which have been determined according to a demodulation reference, representing the predetermined amplitude levels of a modulation scheme, or the negative of those levels. A "sum-signal" is a signal produced by adding (or summing) the I-branch and Q-branch signals. A receiver, upon receiving the sum-signal, can separate the two branches therein, and measure the amplitude of each branch. A "branch amplitude" is the amplitude of an I or Q branch signal, as determined by a receiver. The receiver can demodulate a message element by extracting its I and Q branch signals, measuring their branch amplitudes, and comparing to the levels of a calibration set according to a preceding demodulation reference. An "amplitude deviation" of a message element is the difference between its I or Q branch amplitude and the closest predetermined amplitude level in the calibration set. Accordingly, the "modulation quality" of a message element is a measure of how close the I and Q branch amplitudes are to the closest predetermined amplitude level of the modulation scheme, or equivalently how close the modulation of the message element is to the closest state of the modulation scheme, as indicated by amplitude levels in the calibration set. Thus the "closest state" of the modulation scheme to a particular message element is the state that has the closest amplitude levels to the I-branch and Q-branch amplitudes. Each state corresponds to a first predetermined amplitude level and a second predetermined amplitude level, corresponding to the I-branch and Q-branch amplitudes of a demodulation reference, for example. The closest state to a particular message element is the state in which the difference between the first predetermined amplitude is closest to the message element's I-branch amplitude and the second predetermined amplitude is closest to the message element's Q-branch amplitude. The modulation quality may be calculated by adding those differences in magnitude, or the square root of the sum of the squares of the differences, or other formula relating the deviation of the message element's amplitudes from the modulation state's amplitudes.

A message may be configured "time-spanning" by occupying sequential symbol-times at a single frequency, or "frequency-spanning" on multiple subcarriers at a single symbol-time. An "EDC" (error-detecting code) is a field in a message configured to detect faults, such as a "CRC" (cyclic redundancy code) or a parity construct or the like. A message is "unicast" if it is addressed to a specific recipient, and "broadcast" if it includes no recipient address. Transmissions are "isotropic" if they provide roughly the same wave energy in all horizontal directions. A device "knows" something if it has the relevant information. A device "listens" or "monitors" a channel or frequency if the device receives, or attempts to receive, signals on the channel or frequency. A message is "faulted" or "corrupted" if one or more bits of the message are changed relative to the original message. "Receptivity" is the quality of reception of a message. If one or more elements of a "subject" message have been changed when received, the message "fails the EDC test", that is, the embedded error-detection code disagrees with the bit-level content of the message. The fault may have occurred during the modulation step in the transmitter, or in propagation through the air, or at the receive side, and may be due to electronic noise or external interference or atmospheric absorption or scattering or reflection of the electromagnetic wave, to name just a few possible sources of message faults. Distortion of the I and Q branch amplitudes can cause the receiver to incorrectly demodulate the message elements, in which case the message fails the EDC test. "AI" (artificial intelligence) is computer-assisted decision-making, usually within a myriad of conflicting factors. "ML" (machine learning) is automated analysis of examples to develop computer means for recognizing similar examples thereafter. An "AI array" is a software construct, such as a neural net, including adjustable variables that can be trained to solve complex problems. An "AI model" is an AI array in which the variables have been at least partially trained according to a particular problem, and which can provide output results or predictions based on input parameters.

When a message is corrupted as received, the fault may have occurred during the modulation step in the transmitter, or in propagation through the air, or at the receive side, and may be due to electronic noise or external interference or atmospheric absorption or scattering or reflection of the electromagnetic wave, to name just a few possible sources of message faults. Amplitude or phase distortion can cause the receiver to incorrectly demodulate those message elements, in which case the message fails the EDC test. Upon detecting a faulted message, the recipient in 5G or 6G can do one of several things. If the recipient knows that the message is intended for it, such as a base station that has scheduled an uplink message at a particular time or a user device with a scheduled downlink message, the recipient can request a retransmission responsive to the fault. For most downlink control messages, however, the user device does not know the time or frequency or length of a message, or even if the message is intended for that user device, because the downlink in 5G/6G generally relies on a "blind search" for user devices to locate their control messages, and a faulted message would appear as not intended for that user device. Therefore, user devices can request a retransmission after failing to receive an expected message after a certain amount of time, or by not transmitting an acknowledgement, among other options. In each case, the time involved in responding to a faulted message is substantial, especially for critical low-latency applications such as remote surgery and traffic safety.

In contrast, the disclosed systems and methods for message fault correction may be carried out in a fraction of the retransmission time, thereby repairing the message, avoiding the retransmission delays, enhancing network reliability, and avoiding adding to the electromagnetic background by avoiding the retransmission, among other benefits, according to some embodiments. The receiver can determine the modulation quality of each message element by measuring how far the I and Q branch amplitudes of the message element deviate from the closest predetermined amplitude levels of the modulation scheme, or equivalently, from the closest state of the modulation scheme. The receiver can then alter the "suspicious" message elements that have a modulation quality lower than a threshold value. Equivalently, the receiver can alter suspicious elements that have amplitude deviations larger than a predetermined limit. The receiver can then alter the suspicious elements (or, more specifically, the receiver can alter which modulation state the message element is assigned to), and can test the altered version against the error-detection code. By altering the state assignments of each suspicious element of the message, the receiver may search for the correct version of each message element. The receiver can also determine a "direction" according to the type of deviations detected, relative to the closest state of the modulation scheme, thereby further guiding the mitigation. If the receiver receives a retransmission of the same message, the receiver can then merge the two versions by selecting whichever message element has the higher modulation quality, thereby eliminating most or all faulted message elements from the merged version. In addition, the receiver can determine a message portion that contains all of the suspicious elements, and then can request that only the indicated portion be retransmitted, thereby saving further time. For complex communication environments with multiple competing priorities, an AI-based algorithm can be prepared for fault mitigation by accounting for many complex factors, and can be adjusted or "tuned" to optimize a network operation parameter, for example. With these methods, receivers can greatly reduce most types of communication errors, according to some embodiments.

Following are examples of PAM modulation schemes, according to which a faulted message element may be revealed and possibly repaired.

FIG. 1A is a chart showing exemplary embodiments of components of a PAM signal, according to some embodiments. As depicted in this non-limiting example, a PAM-modulated message element includes two "branches" labeled I and Q, each branch being a sinusoidal signal which is amplitude modulated at one of the predetermined amplitude levels (or its negative) of the modulation scheme. The branch amplitudes thereby encode the bits of the message element. The I branch 101 is depicted here as a cosine curve, while the Q branch 102 is a sine curve. The two branches 101, 102 are summed and transmitted as the sum-signal 103. The Q branch has zero signal at a zero-degree phase where the I branch is maximum, and the I branch is zero at the 90-degree phase at which the Q branch is maximum. The receiver, by selecting each branch separately (using RF mixers, for example), can measure the amplitude of each branch, and thereby identify the message bits encoded in those amplitude levels. For example, the receiver may determine that the "branch amplitude" of the I branch 101 is as indicated by a square 104, and the amplitude of the Q branch 102 is as indicated by another square 105.

Generally, the transmitter sets each of the branch amplitudes 104 and 105 to equal one of the predetermined amplitude levels of the modulation scheme, or its negative. For example, in 16QAM with PAM modulation, there are two predetermined amplitude levels (such as +1 and +3 in some units), and their negatives. Each branch can then be amplitude modulated according to one of the predetermined amplitude levels or its negative, such as +3, +1, −1, −3). In this context, the "predetermined amplitude levels of the modulation scheme" can include both positive and negative values, thereby including all four predetermined values in the calibration set by which the received message elements are then demodulated. The values are generally arranged to be uniformly separated. The sum-signal 103 is the sum of the two branches 101 and 102, each with a branch amplitude set equal to one of those four values, thereby constructing 16 possible states. Higher-order modulation include more predetermined levels (three in 64QAM, in for 256QAM, and so forth). QPSK, with 4 states, has only a single predetermined amplitude level, which can be positive or negative for each of the two branches, thereby forming 4 states as expected. As mentioned, in PAM the number of states in the modulation scheme is then $(2\ L)^2$, accounting for both positive and negative values of the L predetermined amplitude levels of the modulation scheme.

In some embodiments, the receiver can also analyze the sum-signal itself 103 to extract further information about the modulation quality, or to reveal modulation information more readily measured than the branch amplitudes. For example, the figure further indicates as 106 the amplitude of the sum-signal, and its peak phase as 107. As described below, the receiver may extract fault information by testing the sum-signal properties, and/or by comparing the sum-signal properties to the expected PAM levels.

Figure 1B:
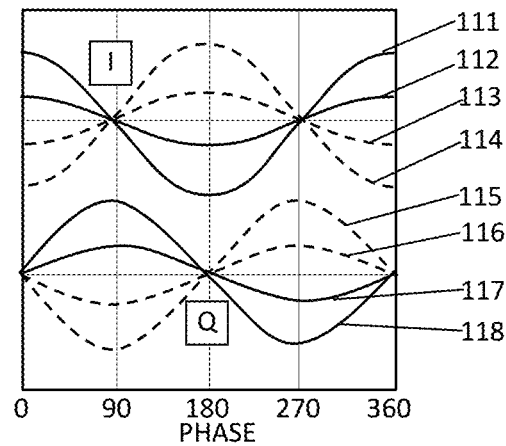
FIG. 1B is a chart showing exemplary embodiments of further components of a PAM signal, according to some embodiments.

FIG. 1B is a chart showing exemplary embodiments of further components of a PAM signal, according to some embodiments. As depicted in this non-limiting example, eight waves are shown depicting I branches and Q branches for various modulation states. In PAM, a small number (such as two) positive amplitude levels may be predetermined. In modulating the branches of a message element, the amplitude levels may be provided as either positive or negative values, and the phase may be provided as zero or 90 degrees, thereby composing the eight curves depicted. The message element is then transmitted with one of the four I waves added to one of the four Q waves, thereby generating 16 states of a modulation scheme such as 16QAM. In higher order modulation, more amplitude levels are provided, but the procedure is the same.

More specifically, wave 111 represents the maximally positive I branch signal, 112 the minimally positive I signal, and 113 and 114 the minimally and maximally negative I signals, respectively. On the Q branch, 118 and 117 are the maximally and minimally positive levels, while 115 and 116 are the maximally and minimally negative signals, respectively. The receiver, by determining which of the predetermined amplitude levels most closely matches the detected I or Q branch amplitude, can thereby demodulate the message element.

Figure 1C:
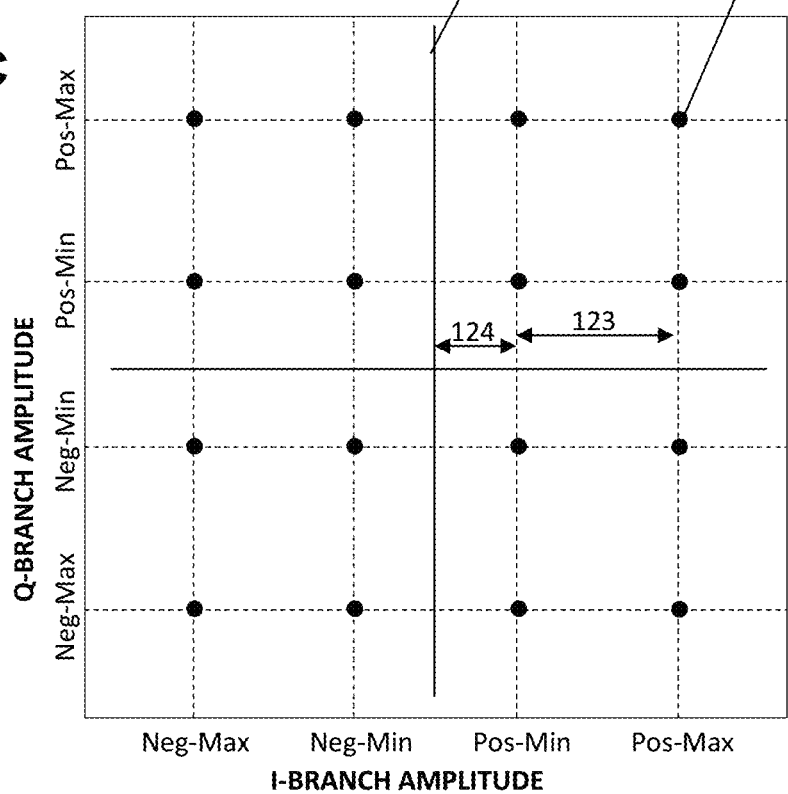
FIG. 1C is a "constellation" table showing an exemplary embodiment of states of a PAM modulation scheme, according to some embodiments.

FIG. 1C is a constellation chart showing an exemplary embodiment of states of a PAM modulation scheme, according to some embodiments. As depicted in this non-limiting example, 16 states are indicated as dots 125 in an array with the predetermined I-branch amplitude levels shown horizontally and the Q-branch amplitude levels vertically. The branch levels are labeled as "Pos-Max" for the maximally positive amplitude value, "Pos-Min" for the minimally positive amplitude level, then "Neg-Min and Neg-Max" for the maximally and minimally negative amplitude states. The transmitted message element is composed of one I-branch amplitude signal plus one Q-branch amplitude signal, transmitted together as a sum-signal.

The central cross shape 122 indicates zero amplitude. In PAM generally, zero amplitude is not used for messaging, and the branch phases are offset from the carrier by 45 degrees for carrier suppression. In the chart, the minimally positive amplitude is each displaced from zero by the value 124, and the maximally positive level is an additional amount 123. For example, the value 124 could represent one unit and the value 123 could represent two units, thereby providing that the various states are all separated from their adjacent neighbors by the same amount, namely two units. The receiver, by measuring the I and Q branch amplitudes and comparing to a previously-determined set of amplitude levels (from a demodulation reference, for example), can select the modulation state with the closest match to the measured amplitudes and thereby demodulate the message element.

The following examples indicate how faulted message elements in a PAM-modulated message may be detected.

Figure 2A:
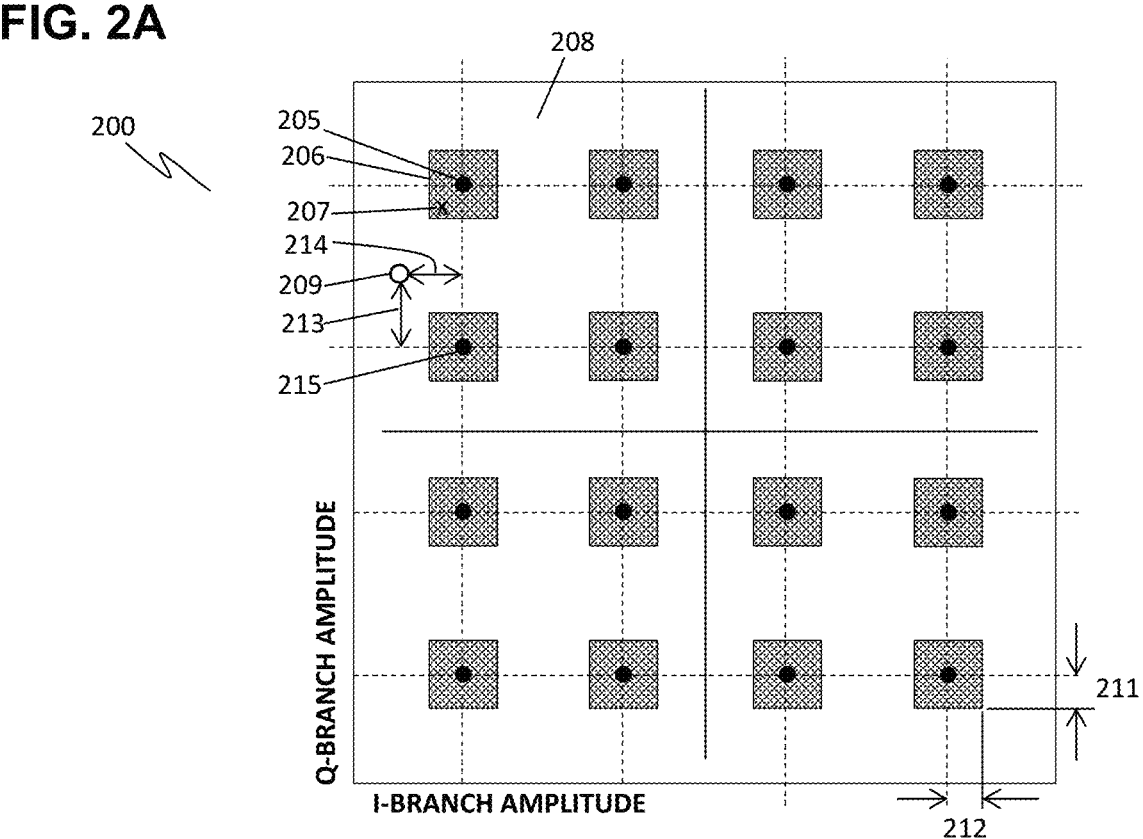
FIG. 2A is a schematic showing an exemplary embodiment of a constellation table for 16QAM, according to some embodiments.

FIG. 2A is a schematic showing an exemplary embodiment of a PAM constellation table, according to some embodiments. As depicted in this non-limiting example, a constellation table 200 includes 16 states 205 of 16QAM, each state 205 including one of the four I-branch amplitudes summed with one of the four Q-branch amplitudes. Around each modulation state 205 is a rectangular form in dark stipple representing a "good-modulation zone" 206 (or "good-mod" in figures). The size of the good-modulation zone 206 is shown as the dimensions 211 and 212. Usually, the good modulation zone 206 is square. If the receiver measures the message element's branch amplitudes to be within one of the good-modulation zones 206, the message element is assigned to the associated modulation state 205. For example, the small "x" 207 indicates a measured as-received message element, having an I-branch amplitude and a Q-branch amplitude accordingly, thereby falling within the good-modulation zone 206 of the associated state 205.

The exterior white space 208 is a "bad-modulation zone" (or "bad-mod") in which the modulation of the message element falls outside all of the good-modulation zones, and therefore is invalid or illegal and not used for modulation. For example, a particular message element is received with modulation in I and Q amplitudes as depicted by an "o" 209, which is in the bad-modulation zone 208. The received message element may exhibit an I-branch amplitude deviation 214 and a Q-branch amplitude deviation 213 relative to the closest modulation state, which in this case is 215. If the I-branch amplitude deviation 214 is greater than the good modulation zone width 212, or the Q-branch amplitude deviation 213 is greater than the good modulation zone height 211 (relative to the nearest state 215), then that message element is flagged as bad-modulation. In some embodiments, the bad-modulation message elements may be assigned to the nearest modulation state 215 initially, although this assumption may be revised later if the message fails its error-detection test.

After all of the message elements have been assigned to the closest states of the modulation scheme, the message may be checked against an error-detection code which is normally embedded in the message. If the message agrees with the error-detection code, the tentative assignment of the bad-modulation message elements is confirmed, and the message has been successfully demodulated. If not, the receiver may attempt to recover the message by altering the bad-modulation message elements. As used herein, "altering" a message element means changing which state of the modulation scheme is assigned to the message element. After changing the assigned state of the suspicious message element, the altered message may be tested again with the error-detection code to see if the altered message is the correct version.

Figure 2B:
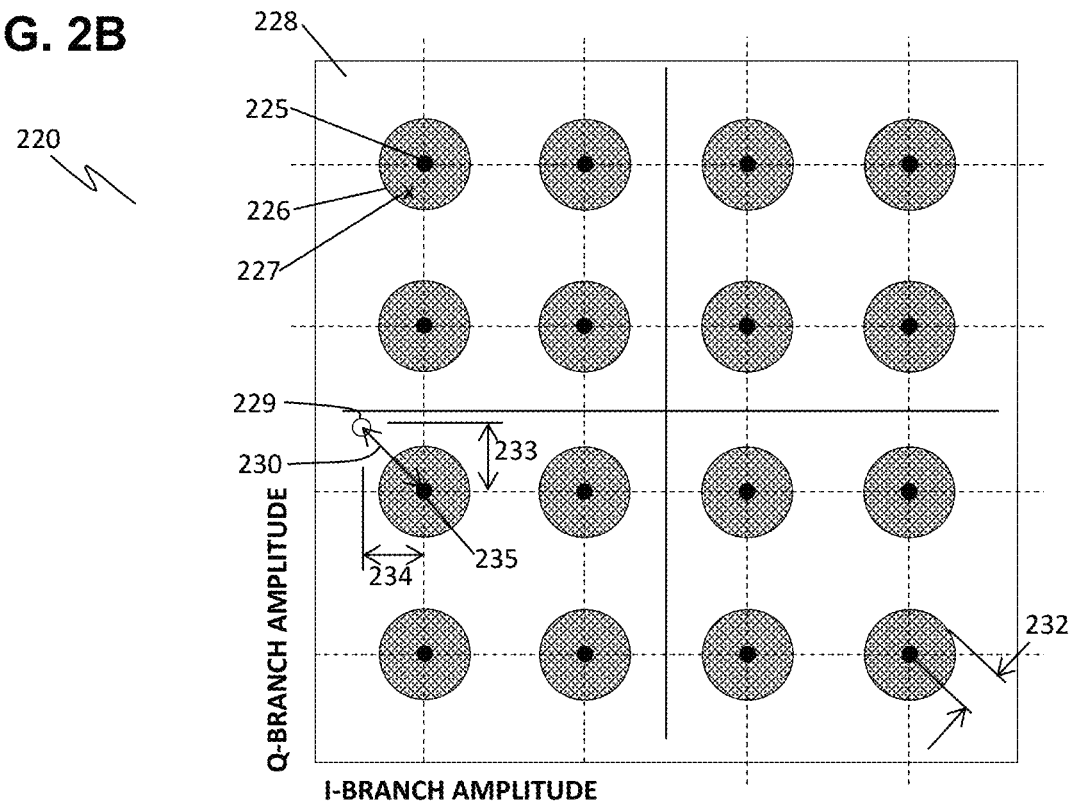
FIG. 2B is a schematic showing another exemplary embodiment of a constellation table for 16QAM, according to some embodiments.

FIG. 2B is a schematic showing another exemplary embodiment of a PAM constellation table for 16QAM, according to some embodiments. As depicted in this non-limiting example, the constellation table 220 may include four I-branch amplitude levels and four Q-branch amplitude levels, for sixteen states 225. Each state 225 is surrounded in this case by a circular good-modulation zone 226, each with a radius 232 as indicated. The exterior white space 228 represents bad-modulation.

A particular message element "x" 227 is shown in a good-modulation zone 226 associated with the state 225. The radial distance (not labeled) between the message element's modulation and the closest state is less than the radius 232 of the good-modulation zones.

Another message element "o" 229 has an I-branch amplitude deviation 234 and a Q-branch amplitude deviation 233, and is at a distance 230 from the nearest state 235. If that distance 230 is less than the radius 232 of the good-modulation zone, the message element is allocated to "good-modulation". However, in this case the distance 230 is greater than the radius 232, and therefore the message element is flagged as "suspicious" or "bad-modulation" and may be altered later for fault mitigation, if needed. Initially, however, the message element may be assigned to the nearest state 235 for purposes of demodulating the message.

While the figure shows the 16QAM modulation scheme, many other modulation schemes are possible. For example, 64QAM and 256QAM involve additional I and Q amplitude levels, whereas QPSK has only a single amplitude level (repeated positive and negative, I and Q, thereby making four QPSK states). The methods described herein for 16QAM can be applied straightforwardly to QPSK and higher QAM modulation schemes, according to some embodiments.

The figure, and the other examples to follow, are presented according to a standard pulse-amplitude modulation scheme. In other embodiments, however, the message may employ classical amplitude and phase modulation, in which each message element is amplitude modulated according to one of Namp amplitude levels and phase-modulated according to one of Nphase phase levels. The multiplexed amplitude and phase modulations thereby generate Namp×Nphase distinct states. For example, with classical amplitude-phase modulation, 16QAM has four amplitude and four phase levels, resulting in 16 combinations. Upon receipt, the receiver measures the amplitude and phase of the signal, then selects whichever predetermined state most closely matches those values. The systems and methods described herein are straightforwardly applicable to classical amplitude and phase modulation as well as other modulation technologies. As long as the modulation scheme involves modulating the phase and/or the amplitude of an electromagnetic wave, it is immaterial which modulation technology is employed. For consistency and clarity, most of the examples refer to PAM, however the principles disclosed herein may apply to each of these modulation technologies, as will be apparent to artisans with ordinary skill in the art after reading the present disclosure.

Figure 3:
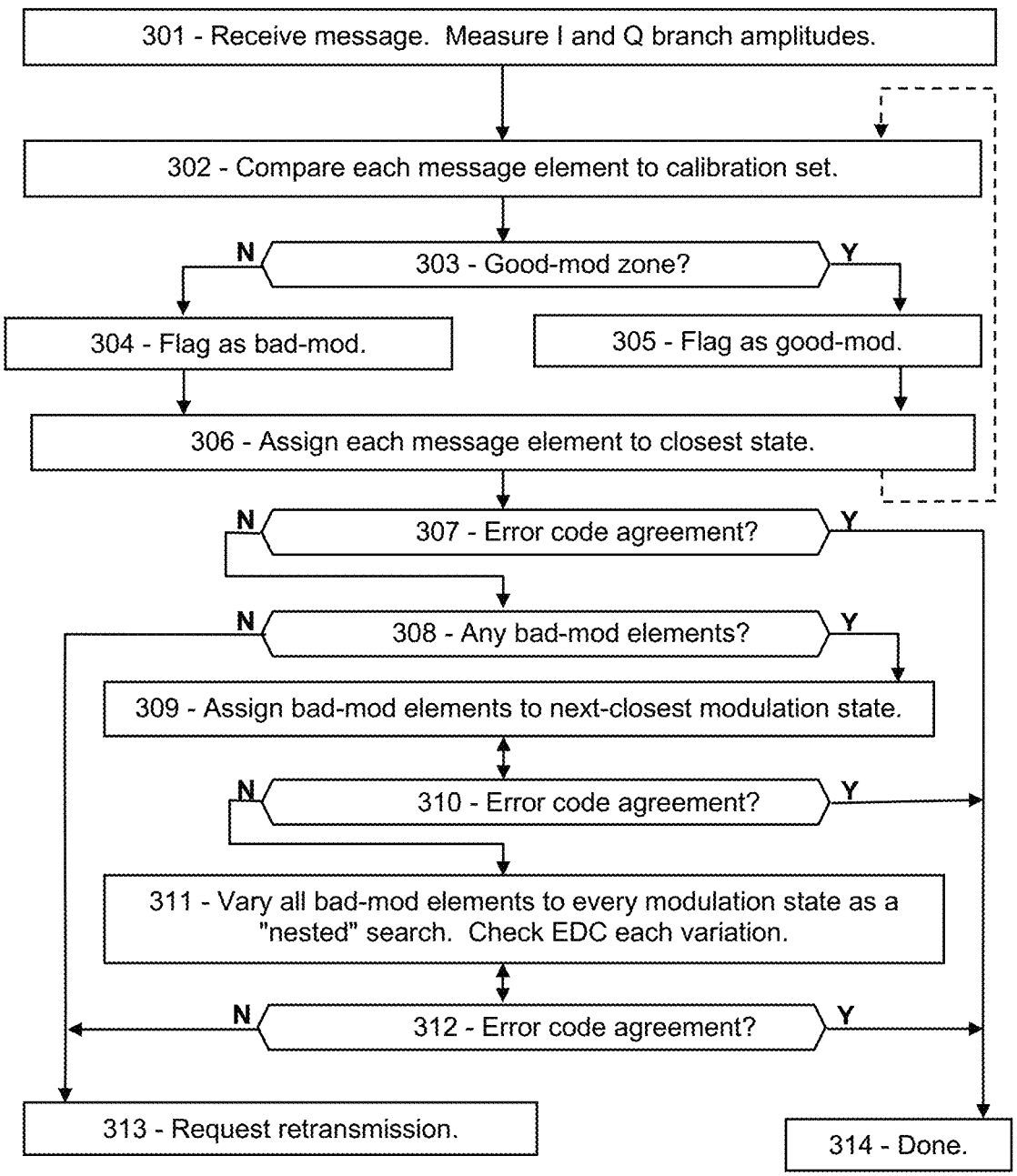
FIG. 3 is a flowchart showing an exemplary embodiment of a process for detecting and correcting message errors, according to some embodiments.

FIG. 3 is a flowchart showing an exemplary embodiment of a process for detecting and correcting message errors, according to some embodiments. As depicted in this non-limiting example, a receiver may receive a message at 301, and may measure the amplitude of each I and Q branch of each message element at 302, and compare each message element's amplitude values to the amplitude levels of a calibration set, which represents the states of the modulation scheme. At 303, the receiver determines whether each message element's amplitude values fall within a predetermined range of one of the states of the modulation scheme. If so, at 305 the message element is flagged as good-modulation. If the message element's amplitudes are outside the range of the states of the modulation scheme (or if the distance to the nearest state is greater than the good-modulation radius), then the message element is flagged as bad-modulation at 304. In either case, at 306 the message element is assigned the nearest modulation state initially. The state determinations, allocations, and assignments are repeated for each message element, as suggested by a dashed arrow.

At 307, after assigning each message element to the closest state, the receiver can compare the message to an error-detection code. If there is agreement, the message is assumed to be correctly demodulated, and the task is done at 314. If the message fails the error-detection code, then at 308 the receiver can determine whether the message includes any message elements flagged as bad-modulation. If not, then the receiver may request a retransmission at 313, or other action depending on reception rules and other conditions. If at 308 there is at least one message element flagged as bad-modulation, then at 309, the receiver may alter the assigned state of each bad-modulation element to the next-closest modulation state instead of the closest one. The "next-closest" state is the closest state to the message element's modulation, except the closest one. Some types of noise and interference cause mainly small changes in the branch amplitudes of the message elements, and therefore an economical strategy for recovering the message may be to alter each bad-modulation element by a small amount, testing each such alteration against the error-detection code.

At 310, the message with the altered assignment is tested against the error-detection code, and if there is agreement, the task is done at 314. If not, the receiver may continue altering any remaining bad-mod element assignments to their next-closest state, one at at time, and test each alteration. After testing each one of the bad-mod elements individually in this way, the receiver can then alter the bad-mod elements two at a time, testing each alteration for agreement with the error-detection code. If not successful, the receiver can alter the assignments in combinations of three, and other numbers of bad-mod elements, altering each one to the nearest and next-nearest states of the modulation scheme. The receiver can continue varying the bad-mod elements until all possible combinations of the bad-mod elements have been altered to their next-closest state of the modulation scheme, and can test each altered message against the error-detection code. This process is a loop, cycling through steps 309 and 310 repeatedly until all combinations have been tested. However, for clarity in the figure, the steps are shown simply as a command 309 and an interrogator 310, with a double-ended arrow between them. The double-ended arrow indicates that the two steps are to be performed repeatedly and cyclically until all the associated variations have all been tested, and aborting the loop if any of the variations passes the EDC test.

If the message fails the error-detection test for all of the alterations of the bad-mod elements to their closest and next-closest states, the flow proceeds to 311 for a more exhaustive search. Here each of the bad-mod message elements is again altered sequentially, but now they are varied to all of the states of the modulation scheme, instead of being restricted to just the closest and the next-closest states, and each such alteration is tested (skipping the already-tested alterations, however). Each of the bad-mod message elements can be tested sequentially at each of the states, while all of the other bad-mod message elements are also altered in turn. Such a grid search, in which two or more items are independently varied among multiple settings, and all possible combinations are tested, may be termed a "nested" search. For example, if there are B bad-mod message elements and the modulation scheme has S states, the number of combinations is $S^B$ separate tests. If any of those tests results in agreement with the error-detection code at 312, the task is done at 314. If none of the tests is in agreement, at 313 a retransmission is requested. The current message is then abandoned, or, in another embodiment, the message may be retained for analysis when the retransmitted version is received.

In most cases, the time required for a retransmission may be much longer than the time required to alter an assigned modulation state of a message element and compare to the error-detection code, and therefore it may be economical to attempt to repair the faulted message in this way, by altering the state assignments of the message elements having the worst modulation quality, as measured by how far the branch amplitude values fail to match the levels of the calibration set. However, there is a limit to how many alterations the receiver can test in a given time. If the number of bad-modulation message elements exceeds a threshold number, the receiver may request a retransmission immediately instead of embarking on a probably futile effort to repair the message.

Figure 4A:
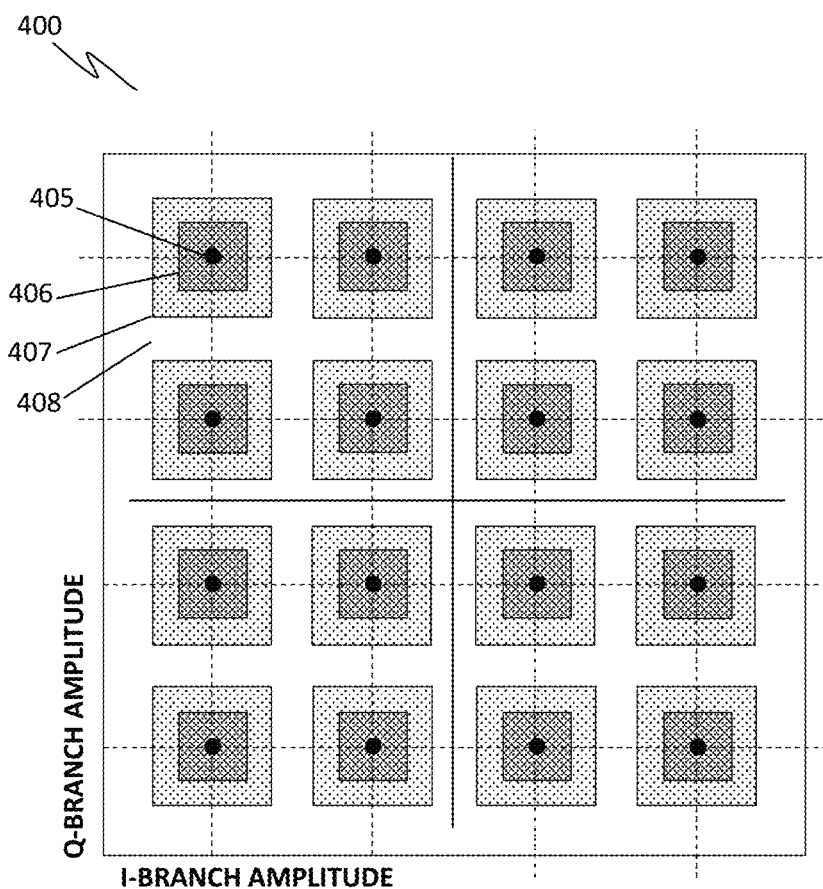
FIG. 4A is a schematic sketch showing an exemplary embodiment of a constellation table with multiple levels of modulation quality, according to some embodiments.

FIG. 4A is a schematic sketch showing an exemplary embodiment of a constellation table with multiple levels of modulation quality, according to some embodiments. As depicted in this non-limiting example, a constellation table 400 (for 16QAM in this case) includes four I-branch amplitude levels, four Q-branch levels, and sixteen states 405. Around each state 405 is a good-modulation zone 406 in dark stipple, surrounded by a marginal (that is, marginal quality) modulation zone 407 in light stipple, and the remaining white space 408 is a bad-modulation zone. A message element with modulation falling in (or occupying) one of the good-modulation zones 406 may be assigned to the associated state 405 of the modulation scheme. A message element with modulation falling in the marginal-modulation zone 407 may also be assigned to the associated state 405, but with a flag indicating that it is suspicious due to its lower quality of fit to the predetermined amplitude levels. A message element with modulation falling in the bad-modulation zone 408 may be assigned to the nearest state 405, but with a flag indicating that it is bad-modulation or very suspicious. If the message is subsequently determined to be faulted, the bad-modulation elements may be altered first, to determine whether any alterations may satisfy the EDC test. If none of those variations succeeds in agreeing with the error-detection code, then the bad-modulation elements and the marginal-modulation elements may be varied together in a nested grid search. The lowest-quality, bad-modulation elements may be varied first because they are the most likely sources of the message failure. If those variations fail to agree with the error-detection code, or if there are no bad-modulation elements, then the message elements with marginal quality modulation may be varied. However, if the number of bad-modulation and marginal-modulation elements exceeds a maximum value, the receiver may request a retransmission instead of performing a grid search, due to the time and calculational effort required to perform large numbers of variations.

Figure 4B:
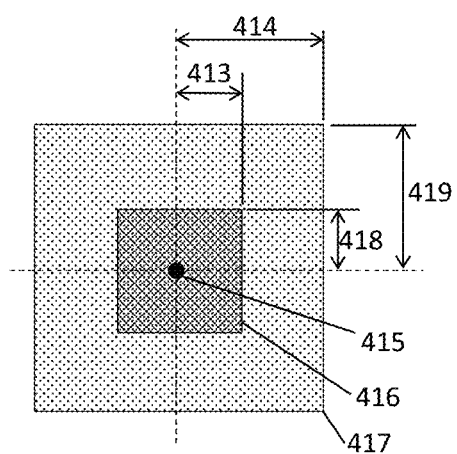
FIG. 4B is a schematic sketch showing an exemplary embodiment of a single modulation state with multiple levels of modulation quality, according to some embodiments.

FIG. 4B is a schematic sketch showing an exemplary embodiment of a single modulation state with multiple levels of modulation quality, according to some embodiments. As depicted in this non-limiting example, a modulation state 415 (such as one of the modulation states of the previous figure) may be configured as the multiplexed I and Q amplitude modulations of the modulation scheme. The modulation state 415 may be surrounded by a good-modulation zone 416, and further surrounded by a marginal-modulation zone 417. The good-modulation zone 416 may be a rectangular region with a half-width 413 in the I-branch and 418 in the Q-branch as shown. The marginal-modulation zone 417 may be a rectangular region with half-dimensions 414 and 419. Message elements modulated in the good-modulation zone 416 may be assigned the associated state 415 with high probability. Message elements modulated in the marginal-modulation zone 417 may also be assigned the state 415 too, but flagged as suspicious. Message elements modulated exterior to the marginal-modulation zone 417 may also be assigned the state 415 if that is the closest one, but may be flagged as likely bad-modulation for the purposes of mitigating faults.

Figure 4C:
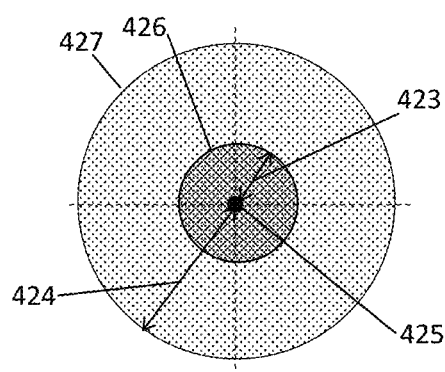
FIG. 4C is a schematic sketch showing another exemplary embodiment of a single modulation state with multiple levels of modulation quality, according to some embodiments.

FIG. 4C is a schematic sketch showing another exemplary embodiment of a single modulation state with multiple levels of modulation quality, according to some embodiments. As depicted in this non-limiting example, a single modulation state 425 may be surrounded by a round region of good modulation 426 which may be surrounded by an annular region of marginal quality modulation 427. The radius 423 of the good-modulation region 426 is shown, and the outer radius 424 of the marginal-modulation region 427 is shown. Thus a message element may be allocated to the good-modulation category if the I and Q branch amplitudes are such that the modulation falls in the good-modulation zone 426, and likewise for the marginal-modulation zone 427. For example, the "distance" of the message element from the state 425 may be calculated as the square root of the I-branch amplitude deviation squared plus the Q-branch amplitude deviation squared. If this distance is less than the good-modulation radius 423 the message element, is allocated good modulation quality. If the distance is greater than the good-modulation radius 423 but less than the marginal-modulation radius 424, the message element may be allocated marginal modulation quality. If the distance is greater than the marginal-modulation radius 424, the message element may be allocated bad modulation quality. The foregoing examples involved categorizing message elements into two or three categories according to modulation quality, and altering the message elements in each category. In some embodiments, the receiver may use any number of such categories, not restricted to two or three. In some embodiments, the receiver may eschew categories and may instead select which message elements to alter based on the calculated distance, in phase-amplitude space, of each message element from the closest state.

Figure 5:
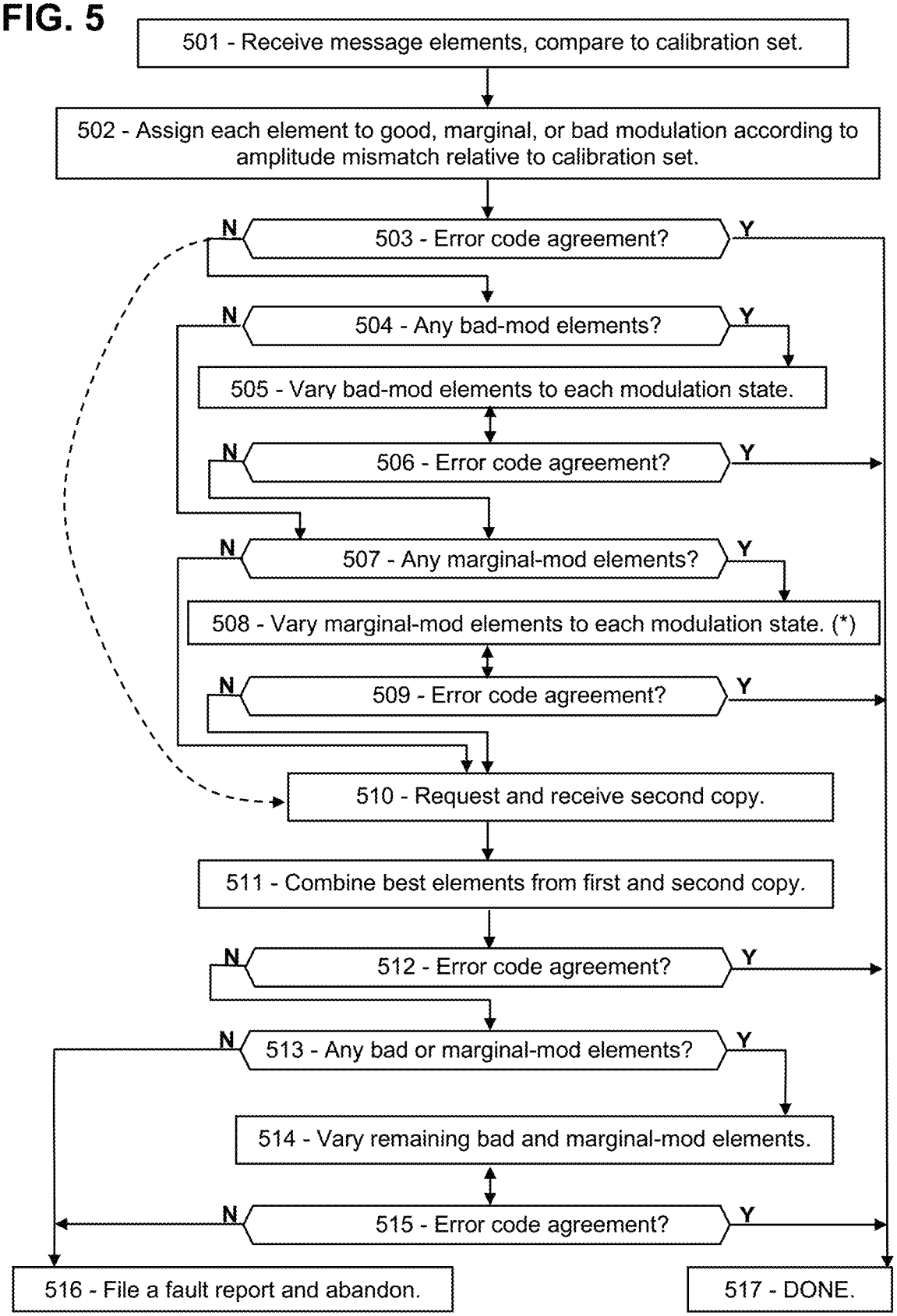
FIG. 5 is a flowchart showing an exemplary embodiment of a process for detecting and correcting message errors using multiple levels of modulation quality, according to some embodiments.

FIG. 5 is a flowchart showing an exemplary embodiment of a process for detecting and correcting message errors using multiple levels of modulation quality, according to some embodiments. As depicted in this non-limiting example, at 501 a receiver receives a message and compares each message element to the amplitude levels previously provided in a calibration set. The calibration set includes the I-branch and Q-branch amplitude levels of the modulation scheme, as provided by a demodulation reference, for example. At 502, the receiver assigns each message element to the closest state of the modulation scheme, and also categorizes the modulation quality of each message element as good, marginal, or bad-modulation depending on the distance of the message modulation to the nearest state of the modulation scheme. After attempting to demodulate the message elements, the receiver compares the message to an error-detection code at 503. If the message agrees with the error-detection code, the task is done at 517. If not, the receiver checks, at 504, whether the message contains any bad-modulation elements, and drops to 507 if not. If the message has one or more bad-modulation elements, at 505 the receiver varies the bad-modulation elements among all of the states of the modulation scheme in a nested grid search, as indicated by a double arrow. For example, the receiver may alter the first bad-modulation element successively to each state, while keeping the other bad-modulation elements assigned to their closest states, and may test each variation against the error-detection code. The receiver may perform a similar scan using the second bad-modulation element while keeping all the others at their closest state values, and may continue such a single-element variation until all of the bad-modulation elements have been explored individually. Then, if no match has been found, the receiver may vary combinations of the bad-modulation elements across all of the states, testing all combinations of the bad-modulation elements at all states of the modulation scheme. If any one of those variations satisfies the error-detection code, the message is correctly demodulated and the task is done at 517. If not, the flow proceeds to 507.

At 507, the receiver determines whether the message has any marginal-modulation elements, and if so, it varies the marginal-modulation elements and the bad-modulation elements together in a nested search at 508, as indicated by a double arrow. (The asterisk is explained later.) The receiver can vary the bad and marginal-modulation elements in an exhaustive grid search by setting each of the suspicious elements to each of the states of the modulation scheme, and test the error-detection code for each variation at 509. If any of those variations agrees with the error-detection code, the task is done. If not, or if there are no marginal-modulation elements, the receiver may request and receive a second copy of the message at 510, and may merge the first and second copies by selecting the message elements with the best quality modulation at 511, and then may test the merged version against the error-detection code at 512. If successful, it is done. If not, the flow proceeds to 513.

At 513, the receiver may determine whether the merged message still includes any bad or marginal-modulation elements. The receiver may also note any message elements that differ in the originally received version and the retransmitted version, yet occupy good-modulation zones in each version. Such message elements are termed "paradoxical", and may be flagged as suspicious since the two message copies contradict each other. If the merged message has all good-modulation message elements and no suspicious (bad or marginal or paradoxical) message elements, yet still fails the EDC test, then there is some kind of problem, in which case the receiver may abandon the message at 516 and optionally file a fault report. However, if the merged message has one or more suspicious message elements at 514, the receiver may vary those in another nested search such as described above, testing each variation at 515. If one of those variations agrees with the error-detection code, the task is finally done. If not, the receiver may abandon at 516.

In some embodiments, the receiver may determine the modulation quality as a calculated value, instead of the good-marginal-bad categories. The receiver can then vary the remaining suspicious elements according to the modulation quality value, starting with the message element that has the lowest modulation quality. The receiver can then proceed to vary and test the second-lowest modulation quality message element, and so forth until the error-detection code matches.

In some embodiments, the amount of time required to perform the searches of 506 and 509 may exceed the amount of time to request and receive a second copy of the message, in which case the receiver may request the second copy as soon as the initial version fails the error-detection code, as indicated by a dashed arrow. The receiver may already know how much time it takes to test all combinations given the number of bad and marginal-modulation elements, using an algorithm for example. While waiting for a retransmission, the receiver may continue to test variations, since the receiver might succeed in demodulating the message before the retransmitted message arrives.

In some embodiments, the variations of the marginal-modulation message elements at 508 may be done in two stages for improved efficiency, as indicated by an asterisk (*). Many types of noise cause only small changes in the modulation of message elements, whereas interference from a nearby transmission can cause a large change in the message element. If the background is due mainly to noise or to low-amplitude interference, the amount of distortion produced upon each message element may be small. In that case, the message elements with marginal quality modulation are likely to belong to the associated state or to one of the adjacent states of the modulation scheme, as opposed to a more distant state that differs by a large amount in amplitude and phase. Therefore, the distortion is more likely to move the I-branch or Q-branch amplitude (or both) by one amplitude step than a larger number of amplitude steps. The receiver may exploit this by altering each of the marginal-modulation message elements to its nearest neighbors and testing those small-step alterations first, before attempting larger jumps. For example, a particular state of the modulation scheme has eight adjacent states if the particular state is in the middle of the constellation table, or five adjacent states if at one edge, or three adjacent states if at a corner. The receiver may save time and enhance the likelihood of finding a solution by testing those eight (or five or three) nearest-neighbor alterations first, before testing the larger variations across the entire constellation table. If the message has more than one marginal-modulation element, the receiver may perform a nested grid search by altering the assigned state of each of the marginal-modulation message elements to each of their adjacent states, exploring all combinations of all marginal-modulation elements in their adjacent states. If none of those adjacent-neighbor alterations passes the EDC test, then the receiver may proceed to vary the marginal-modulation message elements across the entire set of states of the modulation scheme (preferably skipping the alterations that have already been checked). By testing the most likely combinations of message alterations first, the receiver may avoid a large number of unlikely variations, and may thereby resolve the fault and recover the correct message quickly, according to some embodiments.

The systems and methods disclosed herein further include "directional sectors" defined around each state of the modulation scheme. The directional sectors may indicate how a faulted message may be recovered, according to some embodiments.

Figure 6A:
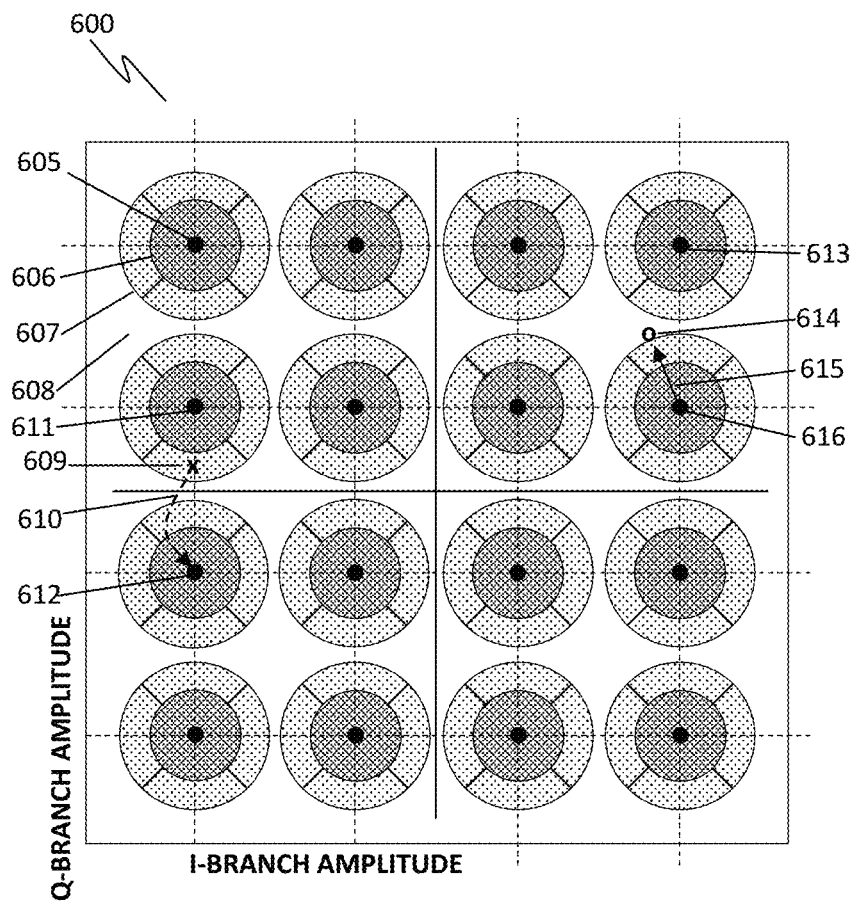
FIG. 6A is a schematic sketch showing an exemplary embodiment of a constellation table for 16QAM with directional deviation sectors, according to some embodiments.

FIG. 6A is a schematic sketch showing an exemplary embodiment of a constellation table for 16QAM with directional deviation sectors, according to some embodiments. As depicted in this non-limiting example, a constellation table 600 includes states 605, each state surrounded by a good (quality) modulation zone 606 and a marginal (quality) modulation zone 607 within white space bad (quality) modulation area 608. The marginal-modulation zones 607 are divided into multiple sectors, as explained in more detail in the next figure.

The sectors may assist the receiver in recovering a faulted message. For example, if a message fails the EDC test, the receiver may look for a particular message element modulated in a marginal-modulation zone 607, such as the "x"

609. The message element represented by the "x" 609 is initially assigned to the nearest state which is 611. However, since the message fails the error-detection test with that assignment, and since the "x" message element's modulation quality is only marginal, the receiver may attempt to correct the message by altering the assignment to a different state. For example, the receiver may alter the assignment to the adjacent state in a direction indicated by the sector that the "x" 609 occupies, that is, altering the assignment to the state 612. In the depicted case, the "x" 609 is in a sector directed toward a lower Q-branch amplitude state with the same I-branch amplitude, and therefore the receiver may attempt altering the message element to the next-lower Q-branch amplitude 612, as indicated by a dashed arrow 610, and may test that message alteration against the EDC code. Direction-assisted alteration may be an economical strategy for mitigating a message fault first in a direction as indicated by the occupied sector, before embarking on a wider search. The receiver may thereby enhance the probability that the correct state assignment may be determined without having to vary multiple message element assignments across the entire modulation table.

The figure further depicts another message element "o" 614 which lies in the bad-modulation zone 608 but has been assigned to the nearest state 616 of the modulation scheme. Also shown is an arrow 615 indicating a direction of the message element's modulation relative to the nearest state 616. If the message is found to be faulted, then the bad-modulation message element 614 may be re-assigned to the closest neighboring state in the direction of the arrow 615, which in this case is the state 613, and that alteration may be tested against the error-detection code. Instead of using sectors to define a direction, and instead of restricting the directionality to just the marginal-modulation elements, the arrow 615 pointing toward the message element's location on the constellation table may be used to guide the first and most likely alteration, which is to state 613 in this case.

In some embodiments, the receiver may determine which message elements are most likely faulted, and in which direction to alter the state assignment, according to calculations instead of zones and sectors. For example, the receiver can determine a modulation quality according to a distance from the message element's modulation to the nearest state of the modulation scheme, and can calculate a direction according to the position of the message element's modulation relative to the nearest state. If the distance is larger than the distances of any of the other message elements of the message, then the receiver may alter the state assignment of that lowest-quality message element to the adjacent state in the direction calculated, and thereby test the most likely version of the message before embarking on a long and tedious nested search.

Figure 6B:
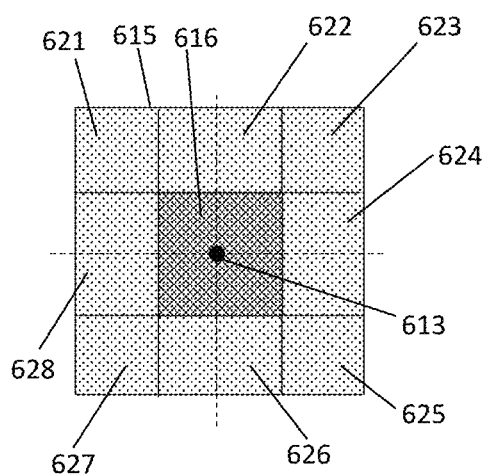
FIG. 6B is a schematic sketch showing an exemplary embodiment of a single modulation state with directional deviation sectors, according to some embodiments.

FIG. 6B is a schematic sketch showing an exemplary embodiment of a single modulation state with directional deviation sectors, according to some embodiments. As depicted in this non-limiting example, a modulation state may include a state 613 with a good-modulation zone 616 surrounded by a marginal-modulation zone 615. The marginal-modulation zone 615 is divided into eight sectors in this case, 621, 622, 623, 624, 625, 626, 627, and 628. The sectors 621-628 may assist the receiver in determining how to modify and recover a faulted message. For example, if the message as-received fails the error-detection code and one of the message elements is modulated according to, say, sector 624, then the receiver may alter that message element to the adjacent state in the indicated direction, and may test that variation.

Figure 6C:
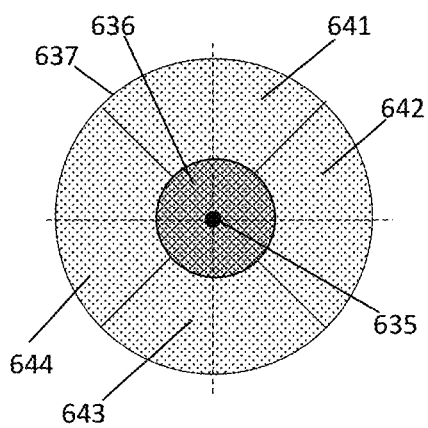
FIG. 6C is a schematic sketch showing another exemplary embodiment of a single modulation state with directional deviation sectors, according to some embodiments.

It may be noted that a state may not have an adjacent state in a specified direction. If the current modulation state 613 is already at the edge of the constellation table, then the receiver cannot increase the state assignment further, and therefore may ignore the sector information if the occupied sector points in an illegal direction FIG. 6C is a schematic sketch showing another exemplary embodiment of a single modulation state with directional deviation sectors, according to some embodiments. As depicted in this non-limiting example, a single modulation state of a modulation scheme is indicated as 635, surrounded by a good modulation zone 636 and a marginal modulation zone 637 which is divided into four sectors 641, 642, 643, 644. As in the previous example, the receiver may receive a faulted message containing at least one marginal-modulation element, and may attempt to recover the message by altering the state assignment of that marginal-modulation element. Initially, the assignment may be altered to an adjacent state in the direction of the sector in which the message element occurs. By making the most likely alterations first, the receiver may thereby find the correct message quickly, saving time and reducing the calculation burden. The receiver may thereby use the sector information present in the marginal-modulation elements of a faulted message as a guide for varying the state assignments of those message elements. If those initial small steps fail to agree with the error-check code, then larger variations may be tested before abandoning the message.

In another embodiment, instead of using categories of modulation quality and sectors in the marginal-modulation zone, the receiver may calculate a direction based on the I and Q amplitude deviations, and may alter a message element with low modulation quality to an adjacent state according to the calculated direction. Basing the initial alteration on the direction of a message element with low modulation quality, relative to the closest state of the modulation scheme, may thereby test the most likely version of the message before attempting a wider search.

Figure 7:
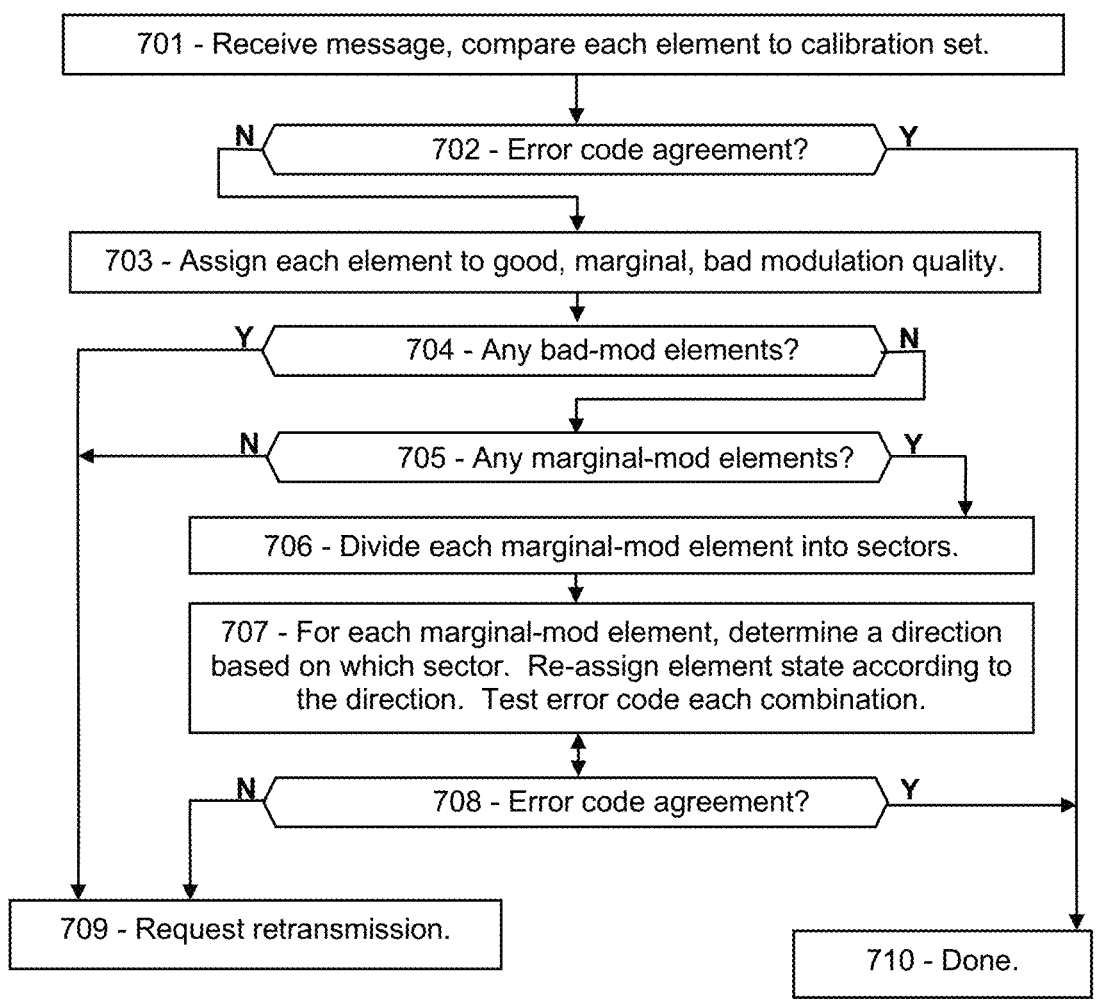
FIG. 7 is a flowchart showing an exemplary embodiment of a process for detecting and correcting message errors according to directional deviation sectors, according to some embodiments.

FIG. 7 is a flowchart showing an exemplary embodiment of a process for detecting and correcting message errors according to directional deviation sectors, according to some embodiments. As depicted in this non-limiting example, a receiver may receive a message at 701, and demodulate each message element using a previously determined calibration set including the branch amplitude levels of the modulation scheme, At 702, the receiver can compare the message to an embedded error-detection code. If the message passes the EDC test, the task is done at 710. If not, at 703 the receiver may allocate each message element to good, marginal, or bad-modulation zones according to the distance from the modulation of the message element to the nearest state, or according to the nearest I and Q amplitude levels. At 704, the receiver determines whether any of the message elements occupies the bad-modulation zone, and if so, the receiver may alter the bad-modulation elements or request a retransmission at 709. If there are no bad-modulation elements, the receiver may determine at 705 whether there are any marginal-modulation elements, in which case the receiver may attempt to recover the message using the sector information. At 706, if not sooner, the receiver may divide each marginal-modulation zone into sectors according to position, and at 707 may determine a direction based on the amplitude deviations of the message element relative to the amplitude levels of the modulation scheme, and may allocate each marginal-modulation message element to one of the sectors. The receiver may then alter each marginal-modulation message element to the adjacent modulation state in the direction indicated by the occupied sector, and may test that variation against the error-detection code. If the altered message passes the error-detection test at 708, the receiver has succeeded in recovering a faulted message and is done. If not, the receiver may request a retransmission and may merge the message with the retransmitted copy, in some embodiments.

In another embodiment, upon receiving a corrupted message, the receiver can calculate a distance value and a direction value according to the modulation of each message element relative to the nearest state of the modulation scheme. To attempt to recover the corrupted message, the receiver can select the message element with the largest distance value, and can alter that message element's state assignment to an adjacent state according to the direction value, and test that altered version against the error-detection code. The receiver can then alter other message element assignments according to their distance values, starting with the largest distance values, and altering each of the message elements to adjacent states according to the direction value. The receiver can perform a nested search among the message elements with distance values exceeding a threshold, for example, testing each such combination. The receiver can begin by altering the message element with the lowest modulation quality, and then proceed to test message elements with successively higher modulation quality. If not successful, the receiver can then alter the message element with the largest distance across all of the states of the modulation scheme, testing each. The receiver can then select further message elements according to distance and vary each according to their direction values or alternatively across the entire modulation scheme, testing each combination. Thus the receiver can select which message elements to alter, and in what order, based on their distance values instead of the good-marginal-bad categories, and the receiver can alter each message element according to the direction value instead of the deviation sectors. In addition, the receiver can calculate how long it will take to perform the alterations, given the number and size of the distance values of the message elements, and can determine whether the amount of time will likely exceed the time required for a retransmission, in which case the receiver may request the retransmission before or concurrently with performing the alterations and tests just described.

Figure 8:
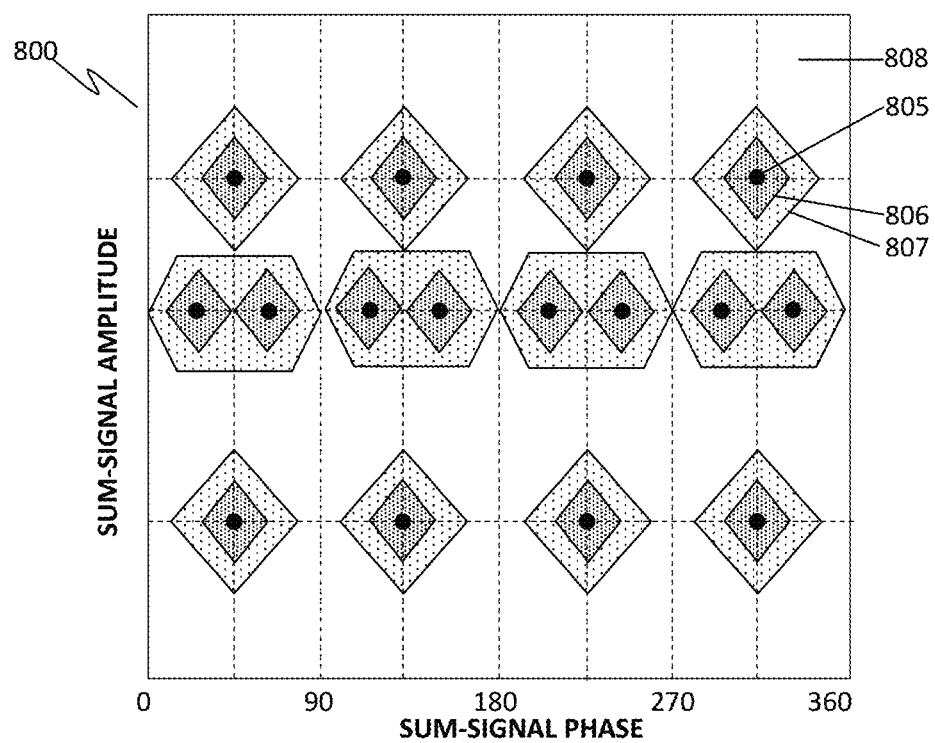
FIG. 8 is a modulation table showing an exemplary embodiment of modulation states and error zones, according to some embodiments.

FIG. 8 is a modulation table showing an exemplary embodiment of modulation states and error zones, according to some embodiments. As depicted in this non-limiting example, a modulation table 800 is an array of modulation states of a modulation scheme, arranged according to a phase and an amplitude of the as-received signal. In the case of a PAM-modulated message, the as-received signal may be the sum-signal, which is equal to the I-branch wave added to the Q-branch wave. In this case, the receiver analyzes the sum-signal without separating the I and Q components. For example, the receiver can analyze the sum-signal for its overall amplitude and phase. Such an analysis corresponds to classical amplitude and phase demodulation. The amplitude and phase of the sum-signal may provide information about noise and interference more readily and/or more precisely than amplitude analysis of the I and Q branches of PAM, in some embodiments.

The depicted modulation scheme in this case is 16QAM, transmitted according to PAM and analyzed according to the amplitude and phase of the sum-signal. Each state is depicted as a dot 805. The non-uniform distribution of states 805 is due to the effects of trigonometrically adding two sinusoidal waves at different phases and amplitudes. Although the position of each state on the modulation table 800 is deterministically determined by the amplitude modulations of the I and Q branches in the ideal case, in practical systems the demodulation results are subject to noise and interference as well as measurement uncertainties. Hence, the sum-signal wave properties, including its amplitude and phase, may provide distinct or at least improved information about which message elements are likely faulted. In some embodiments, each message element may be analyzed by both methods, including amplitude analysis of the separate I and Q branches, and amplitude-phase analysis of the sum-signal before branch separation. Those results may be combined by, for example, allocating a message element to a "suspicious" category if the message element fails a modulation-quality test by either PAM analysis or sum-signal amplitude-phase determination.

In some embodiments, a good-modulation zone 806 and a larger marginal modulation zone 807 may be defined around each state 805 in the modulation table 800, with a bad-modulation zone 808 exterior to the other zones. Message elements in which the sum-signal amplitude and phase occur in the marginal 807 or bad modulation 808 zones may thereby reveal faults that may not be exposed in PAM analysis due to their different sensitivities to interference-induced phase errors, among other differences. In some embodiments, the receiver may test each message element according to the amplitude and phase properties of the sum-signal, then separate the I and Q branches and test each of them for agreement with one of the predetermined branch amplitude levels, and thereby flag a message element as suspicious if the message element appears in the bad or marginal modulation zone according to either the PAM analysis or the amplitude-phase analysis. The receiver may also check that the sum-signal amplitude and phase values are consistent with the PAM state determined from the I and Q branches, and thereby apply yet another independent fault detection test. The receiver may thereby reveal suspicious message elements that may be missed if tested using only a single analysis type.

The examples provided above disclosed methods for evaluating message elements based on the modulation quality. But in real communications, many factors may affect the fault rate and the types of faults likely to occur, and many other types of information may be gleaned from the message elements. For example, the likelihood that a particular message element is at fault may be determined, in part, by the SNR of the signal received because interference or noise is likely to cause the received signal to exhibit variations that can be measured by the receiver. In addition, interference from transmissions in other cells is often time-shifted due to differences in cell time-bases, signal propagation time, etc. In that case, the effects of interference may show up in the modulated signal of each message element in various ways, such as a stepped transition between modulations of adjacent resource elements instead of a sharp transition. Detection of time dispersion may further indicate which message elements are faulted. In addition, if a message is transmitted with a phase-only modulation scheme such as QPSK, then a message symbol with an amplitude different from the other message elements may be suspicious. The receiver may therefore calculate an overall quality factor for each message element, the overall quality factor including some combination of the modulation distance from the nearest state, the SNR, amplitude anomalies, and other measures of message element quality, for example.

Figure 9:
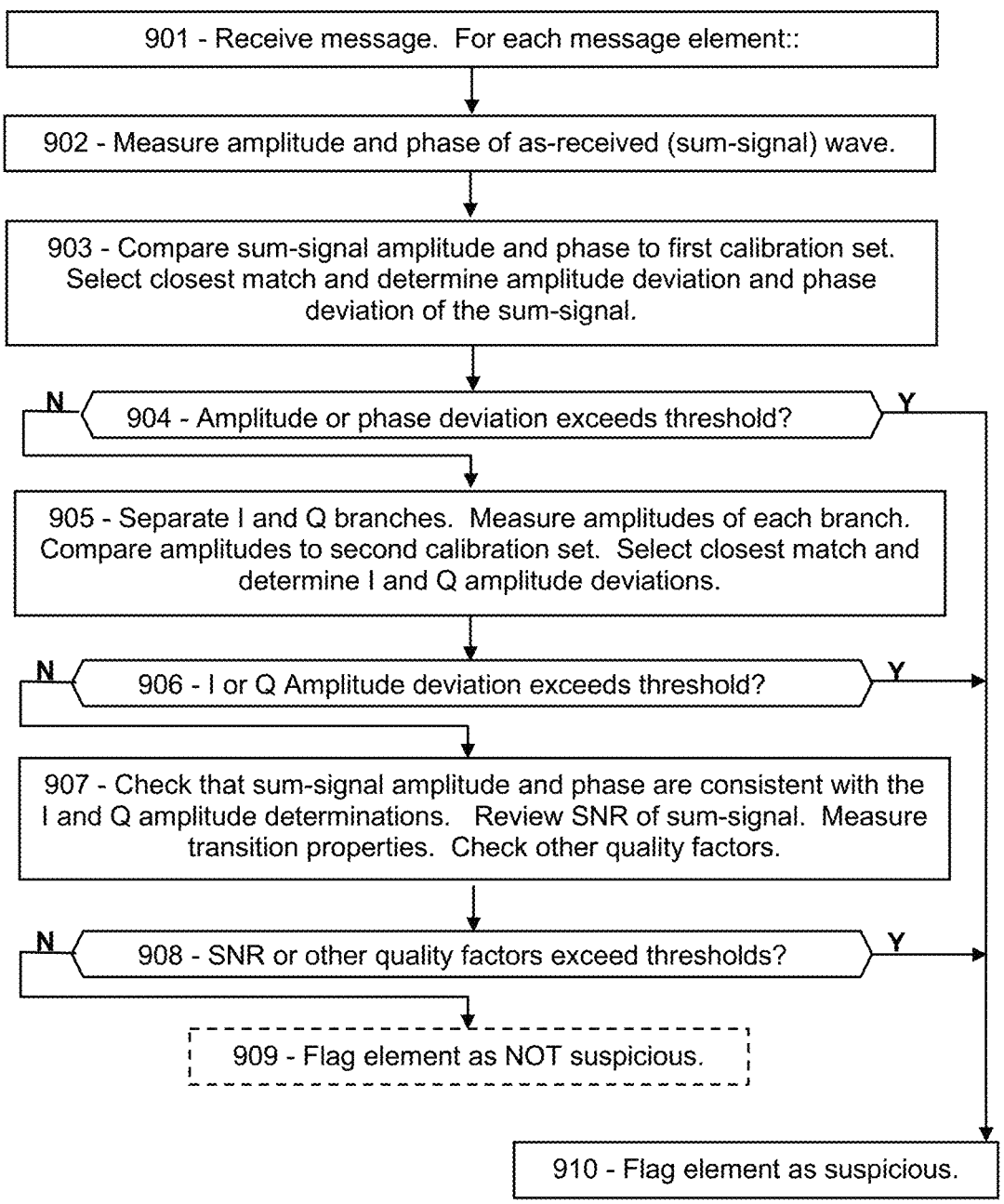
FIG. 9 is a flowchart showing an exemplary embodiment of a procedure for detecting message faults by measuring sum-signal properties, according to some embodiments.

FIG. 9 is a flowchart showing an exemplary embodiment of a procedure for detecting message faults by measuring sum-signal properties, according to some embodiments. As depicted in this non-limiting example, at message faults may be detected by analyzing each received message element from multiple viewpoints including PAM analysis of the I and Q branches, classic amplitude and phase measurements of the sum-signal, measurement of the SNR or transition properties between message elements, and other measures of message quality as may be devised.

At 901, a message comprising message elements is received. For each message element, the rest of the flowchart is then implemented. At 902, the amplitude and phase of the as-received sum-signal are measured and, at 903, compared to a first calibration set that includes the expected amplitude and phase levels of the modulation scheme according to a PAM modulation technology. The receiver may further determine an amplitude deviation and a phase deviation of the message element's sum-signal relative to the closest amplitude-phase match in the first calibration set. Then at 904, the receiver can determine whether the amplitude and/or phase deviation of the sum-signal exceeds a predetermined threshold (including optionally separate thresholds for amplitude and phase). In addition, or alternatively, the amplitude and phase deviations may be combined (and optionally normalized) to determine a distance or a modulation quality of the sum-signal relative to the closest state, and thereby determine whether the distance exceeds a threshold. At 904, if the amplitude deviation or phase deviation of the sum-signal, or other combination, exceeds a predetermined threshold, then at 910 the message element is flagged as "suspicious", although it may be assigned to the nearest state of the modulation scheme anyway.

At 905, the receiver may separate the I and Q branches, then measure the branch amplitudes and compare to a second calibration set that includes the amplitude levels of PAM, including positive and negative levels, as determined from a prior demodulation reference, for example. The receiver may then select the closest match in the second calibration set, and thereby measure the I and Q amplitude deviations of the message element relative to that closest state. At 906, the receiver may determine whether the I or Q amplitude deviations, or both, exceed a threshold, and if so, flag the message element as suspicious at 910.

At 907, the receiver may check whether the amplitude and phase values determined for the sum-signal are in fact consistent with the PAM state implied by the branch-amplitude values for the I and Q branches. The receiver may also measure the SNR of the sum-signal during the symbol-time of the message element. The receiver may measure the transition properties of the sum-signal in switching between the preceding and/or the succeeding message element. The receiver may further determine other parameters related to the modulation quality or likely fault status of the message element. At 908, the receiver may determine whether the SNR or transition properties or other factors exceed their relevant thresholds, and if so, flag the message element as suspicious.

At 909, if the message element passes all of the above tests, the receiver may optionally (in dash) flag the message element as not suspicious. Alternatively, the receiver may simply move on to the next message element without recording anything about the successful message element, since non-faulted may be the default status of most message elements, absent evidence to the contrary.

By performing quality tests on message elements based on PAM amplitudes as well as sum-signal amplitude and phase properties, the receiver may thereby reveal likely faulted message elements that may be difficult to detect using just one of the demodulation technologies. By further including other quality factors such as SNR and transition parameters in the analysis, an improved determination of which message elements are likely faulted and which are likely non-faulted may become feasible. Then, if the number of suspicious message elements is within a practical limit, the receiver may alter each of the suspicious message elements according to their nearest neighbors, optionally with directional assistance, and test each such alteration against the error-detection code, and thereby rescue a faulted message while avoiding the delays and costs involved in seeking a retransmission.

The examples provided above disclosed methods for evaluating message elements based on the modulation quality. But in real communications, many factors may affect the fault rate and the types of faults likely to occur, and many other types of information may be gleaned from the message elements. For example, the likelihood that a particular message element is at fault may be determined, in part, by the SNR of the signal received because interference or noise is likely to cause the received signal to exhibit variations that can be measured by the receiver. In addition, interference from transmissions in other cells is often time-shifted due to differences in cell time-bases, signal propagation time, etc. In that case, the effects of interference may show up in the modulated signal of each message element in various ways. Detection of such time dispersion may further indicate which message elements are faulted. In addition, if a message is transmitted with a phase-only modulation scheme such as QPSK, then a message symbol with an amplitude different from the other message elements may be suspicious. The receiver may therefore calculate an overall quality factor for each message element, the overall quality factor including some combination of the modulation distance from the nearest state, the SNR, amplitude anomalies, and other measures of message element quality, for example.

A demodulation reference, placed before the message, may largely mitigate the effects of noise and interference, depending on the proximity of each message element to the demodulation reference, the time-frequency variations of the noise and interference, and other factors. In addition, the receiving entity may already know information about the incoming message, such as the expected format and length, or partial content information, and may use that information to assess fault probabilities for each of the message elements. Due to these and other interacting variables, determining which messages are faulted is a complex problem, and determining their proper values is even more complex in practice. Therefore, the systems and methods include an artificial intelligence model, trained with massive machine learning, for determining which message elements are likely faulted in a corrupt message. In some cases, the AI model may also provide guidance for finding the correct value of the faulted message elements. The systems and methods further include an algorithm derived from the AI model, configured for base stations and/or user devices to diagnose corrupt messages while minimizing costly retransmissions and message abandonments. Further details are provided in the following examples.

Figure 10A:
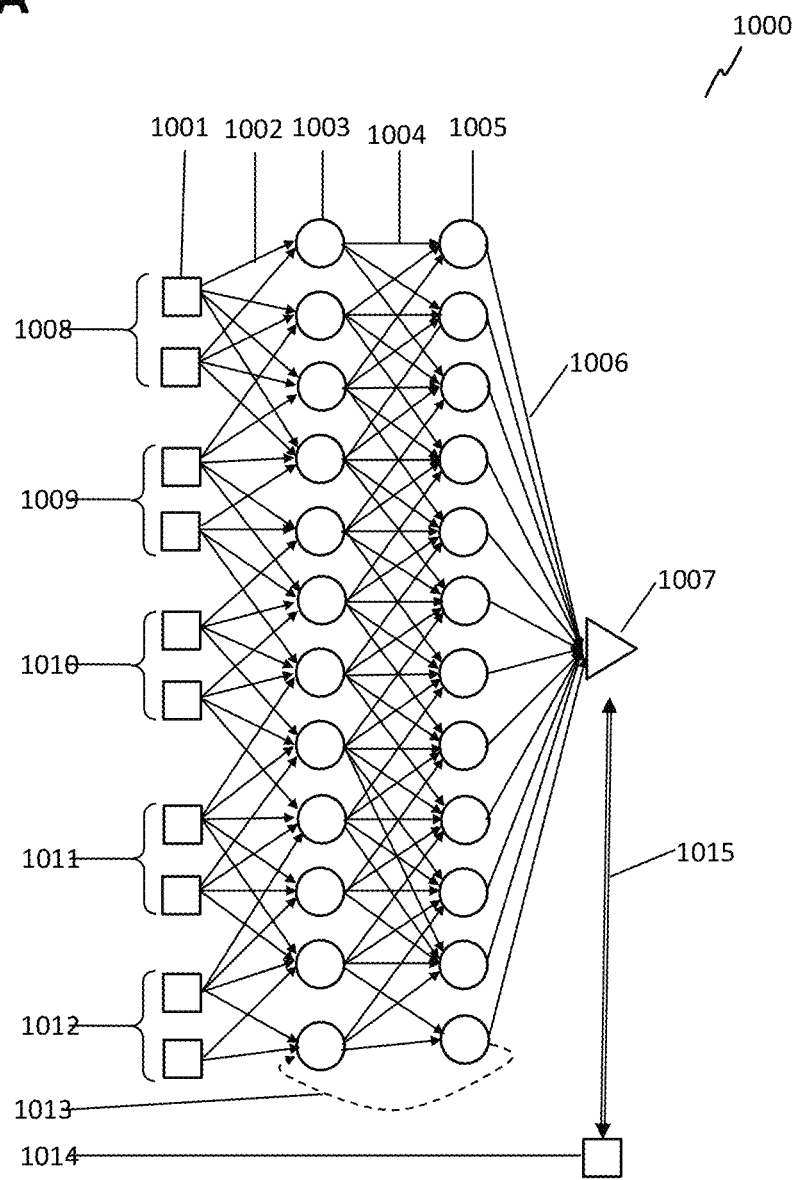
FIG. 10A is a schematic showing an exemplary embodiment of an AI array for detecting and correcting message errors, according to some embodiments.

FIG. 10A is a schematic showing an exemplary embodiment of an AI array for detecting and optionally correcting message errors, according to some embodiments. As depicted in this non-limiting example, an AI array 1000, such as a neural net or other computer software arrangement, may include inputs and output nodes connected to internal functions, including variables that are trained to detect (and in some cases correct) message faults, according to some embodiments. The depicted AI array 1000 includes an input layer 1001 of input parameters represented as boxes, one or more output nodes 1007 represented as a triangle, and two layers of internal "intermediate" functions 1003 and 1005 represented as circles. (The various items are sometimes called "nodes", not to be confused with the nodes of a wireless network.) Weighted directional links 1002 indicate the flow of input data from the inputs 1001 to the first internal layer 1003, and additional weighted directional links 1004 indicate the flow of processed data from the first internal layer 1003 to the second internal layer 1005, and further weighted directional links 1006 indicate the flow of processed data from the second internal layer 1005 to the output node 1007.

When provided with specific input parameters, and "trained" or adjusted to solve a particular problem, the AI array 1000 becomes an "AI model" which, in this case, is configured to determines which message elements in a corrupted message are likely at fault, based on the input parameters, so that the receiver can attempt a mitigation by varying the likely faulted message elements or requesting a retransmission, for example. In some embodiments, the output node 1007 may provide output results such as a list of probabilities, each probability being a predicted probability that one of the message elements is faulted, respectively. In some embodiments, the output results may include indications of the most likely correct values for certain message elements, when feasible. The inputs 1001 may include the modulation quality (such as the modulation category, or the distance from the closest state of the modulation scheme, or the direction of each message element's modulation based on the branch amplitude deviations, as mentioned), as well as the phase and amplitude of the sum-signal, the SNR or other measure of the signal of each message element, and external or environmental measurements related to the noise and interference background 1008, the proximity to one or more demodulation references 1009, signal properties of the message 1010, any retransmissions 1011 including whether each message element is the same or different in the original and retransmitted versions, and (if known) the expected size and format 1012 of the message. In addition, a final input 1014 is shown separate from the others. This input 1014 includes a list of the actual faulted message elements, as determined by comparing the received message to the finally corrected version. (The corrected version is based on agreement with the error-detection code, as mentioned.) However, the list of faulted message elements 1014 is not provided to the array; it is used as a training value. After the model provides output results indicating which message elements are likely faulted, or their probabilities, and optionally their correct values, that prediction is compared 1015 with the "ground truth" data 1014, the list of the actual message element faults.

The AI array 1000 includes directional links 1002, 1004, 1006 which may also include mathematical and/or logical operations, such as multiplying the output values from each node of a previous layer by a predetermined coefficient, and then passing the product to one or all of the nodes of the next layer, among other possible computations. In some embodiments, on the other hand, the links 1002, 1004, 1006 may perform no computation, in which case all functionality is contained in the internal functions 1003 and 1005. Although links are shown in the figure connecting each node to just a portion of the next layer for clarity, in some embodiments every node of each layer is linked to every node of the next layer. Additional layers, and many additional input and output parameters, may be added as needed to model the faulted message elements in a practical network scenario.

The internal functions 1003 and 1005 may include any mathematical or logical functions of the links leading to it. In various embodiments, each internal function 1003 or 1005 may include arithmetic or mathematical formulas, nonlinear functions (such as exponential or arctangent compression functions), Boolean logic (such as, "take link A if link B is larger than link C, and take link D otherwise"), among many other functional options of the data on each link leading to each internal function. Each internal function 1003 and 1005 may include one or more variables or adjustable parameters, which are then adjusted iteratively according to the network data to successively improve the model's predictions. In some embodiments, the internal functions 1003 and 1005 may perform the same operations on all of their inputs, such as averaging, whereas in other embodiments the internal functions process each data flow from each connected link differently. In some embodiments, the AI array 1000 may include feedback 1013 to a previous layer, or bidirectional links, or other complex topology, although convergence is then generally not guaranteed.

The output result is, in this case, a prediction of which message elements are likely faulted. The results may assist a receiver in determining how to process a faulted message. For example, if the number of faulted message elements is less than a predetermined maximum number of faults (such as just one or two remaining faulted message elements), then the receiver may vary the message elements that the AI model has indicated are suspicious. The AI model may indicate a level of suspiciousness or an overall quality factor or a probability of being faulted, for each message element. For example, the receiver can alter the most suspicious or lowest quality message elements in a nested grid search, with some expectation of success. In addition, the AI model may indicate that there are more faults than the predetermined limit for searching, in which case the receiver can request a retransmission instead of embarking on a time-consuming and probably futile search.

In some embodiments, the output result may also indicate the most probable corrected value for each of the faulted message elements. This prediction may be based on the modulation direction relative to the nearest state, for example. The direction may lead to an adjacent state of the modulation scheme. The output result may thereby indicate how the receiver can alter the state assignment of each suspicious message element to efficiently search for the correct version. For example, the receiver can initially vary the message element indicated by the AI model in the suggested direction to the adjacent state, or in another direction as indicated by the AI model based on the inputs. If that alteration fails to agree with the error-detection code, the receiver can then alter the message element among the other near-neighbor states, or to all of the states of the modulation scheme until the altered message agrees with the error-detection code.

The internal function variables and weighting factors and other adjustable variables may be adjusted to "tune" or "train" the model based on prior received message data. The AI model may initially start with the adjustable variables set arbitrarily, or set by logic or intuition, or otherwise. Then, data from actual messages and network activity may be used as the inputs 1001 and the AI model may calculate (or predict) which message elements are faulted, if any. The AI model can also provide a rating as to the likelihood that each message element is faulted. The AI model can also suggest an alteration of the faulted message elements, in some cases.

The prediction 1007 is then compared 1015 to the number and position of actual faults 1014, as determined when the message has been corrected and finally agrees with the error-detection code. In training the AI model, each variable (or a group of variables) may be adjusted in some manner, such as increased or decreased, and the prediction may be again calculated and compared with the actual fault locations. If the prediction is improved by that variation, the variables may be adjusted further in the same manner; but if the prediction is worse, the variables may be adjusted in the opposite way or in some other manner. In each adjustment or series of adjustments of the variables, the most influential variables may be determined empirically, either by varying each variable individually, or by tracing backwards from the output node 1007 through each link and function to determine which variables affect the output result most strongly. Then, subsequent variations may focus primarily on the most influential variables. This iterative training process, of repeated adjustment of variables and comparison of the prediction, may be repeated for a large number of different message types with different noise and interference, and other input parameters, until a particular set of variable values may be found that provides satisfactory predictions of fault locations in messages across a wide variety of situations and interference levels.

After tuning the AI model and obtaining satisfactory fault predictions, an algorithm may be prepared for user devices and networks (or their base stations) to use for fault mitigation in the field. In some embodiments, the algorithm may be the AI model itself, but with the variables frozen at the most advantageous settings. In addition, the algorithm may be simplified by removing ("pruning") the least-productive inputs, links, and internal functions. In other embodiments, the algorithm may be distinct from the AI model but based on it. For example, the algorithm may be a computer program or subroutine, an interpolatable tabulation of values, or a graphical device, among many other calculation means for specifying fault locations in messages according to the input parameters. In some embodiments, two algorithm versions may be developed, such as a complex and versatile version for base stations to use with their high-performance processing power, and a simpler, specialized, or low-complexity version for user devices to use with their more limited processing capability, for example. The version for user devices may have fewer inputs and/or fewer internal functions than the base station, for ease of calculation by a mobile processor.

Figure 10B:
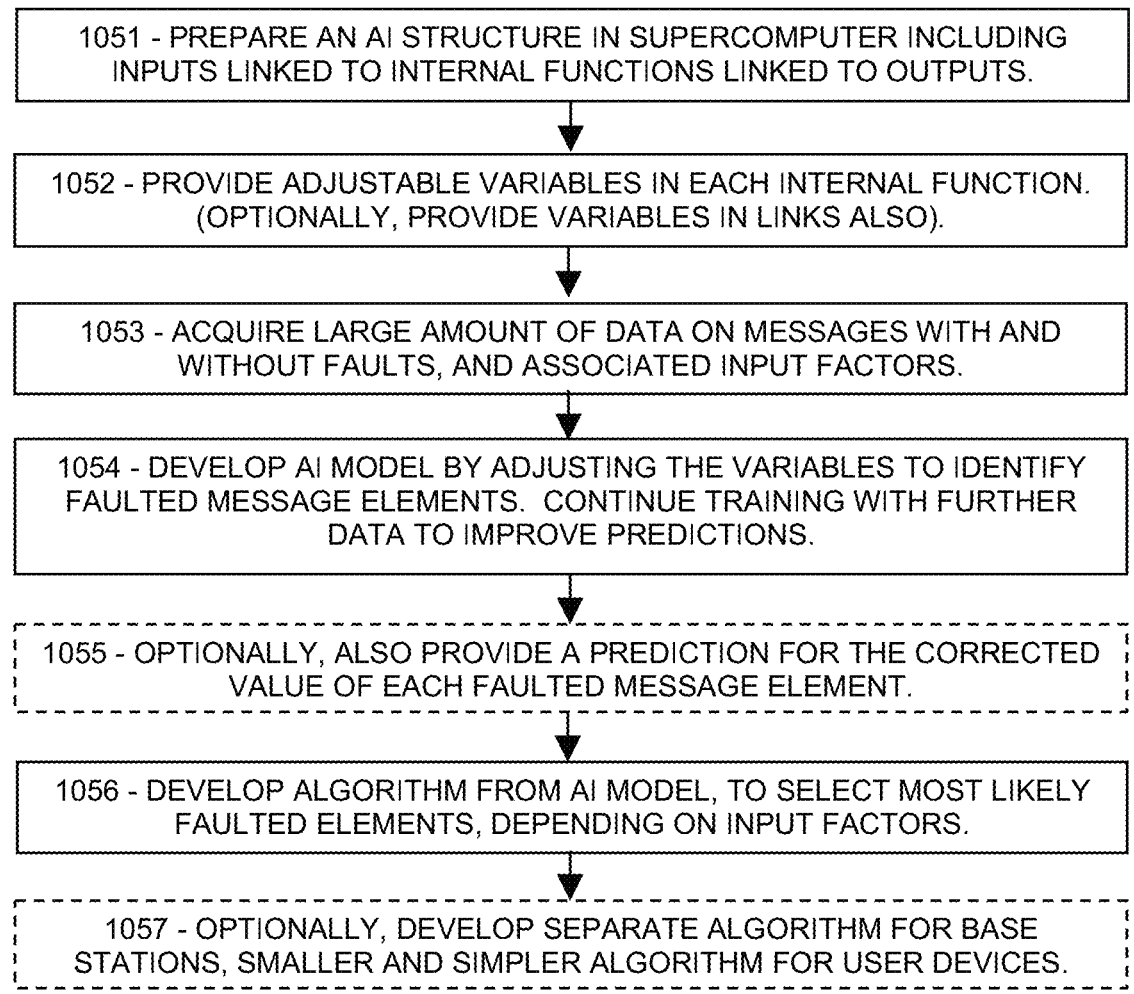
FIG. 10B is a flowchart showing an exemplary embodiment of a process for using artificial intelligence to detect and correct message errors, according to some embodiments.

FIG. 10B is a flowchart showing an exemplary embodiment of a process for using artificial intelligence to detect and correct message errors, according to some embodiments. As depicted in this non-limiting example, at 1051, an AI array is prepared in a computer, with input values linked to internal functions linked to an output node. The AI array may be custom-designed for this application, or may be adapted from a standard AI platform such as a neural net, among many other types of AI arrays. At 1052, adjustable variables are provided in the internal functions and, if applicable, the links. At 1053, data may be acquired (preferably a large amount of data) on messages, received with and without faults, under various network and background conditions. At 1054, an AI model is prepared by adapting the AI array to the fault-prediction problem, by adjusting the internal variables until the output results correctly indicate which message elements are faulted most of the time, or other measure of sufficient performance. The training process may be performed iteratively by adjusting the variables based on individual messages with faults, or by focusing initially on single-fault messages before expanding into multi-fault messages, or by combining ("clustering") multiple message scenarios that share similar features, or other training procedures aimed at finding a set of variable values that identify faulted message elements with sufficient accuracy. Optionally, at 1055, the AI model may also provide suggestions as to the likely correct values of the faulted message elements. For example, the model may suggest that an adjacent state of the modulation scheme may be most likely, based on the modulation quality according to the I-branch and Q-branch amplitudes of each message element, the amplitude and phase of the sum-signal for each message element, the types of noise and interference detected, the expected features of the message, and other factors. At 1056, after obtaining a satisfactory level of success at finding the faulted message elements, a portable algorithm may be developed from the tuned AI model. The portable algorithm may enable base stations or user devices to analyze and mitigate corrupted messages. As mentioned, two versions of the algorithm may be developed at 1057, according to the different capabilities of base stations and user devices, for example.

Due to the potentially large number of inputs and adjustable variables in the model, and the very large amount of training data likely needed for convergence of the model, the AI array is preferably prepared in a supercomputer. The supercomputer may be a classical semiconductor-based computer, with sufficient speed and thread count and processor count to perform the model training in a feasible amount of time. Alternatively, the supercomputer may be a quantum computer having "qbits" or quantum bits as its working elements. Quantum computers may provide special advantages to solving AI models because they can very rapidly explore a complex terrain of values, such as the highly interrelated effects of the various inputs on the output results. Therefore, the systems and methods include a quantum computer programmed to include an AI array and trained on wireless message data to recognize faulted messages, determine which message elements are faulted, and if possible to recommend the most likely values of each faulted message element. By narrowing the number of choices that need to be compared to an error-check value, the AI model may thereby make message error detection and correction feasible, without the need for a retransmission, thereby recovering the correct message contents while saving time and resources.

Figure 11A:
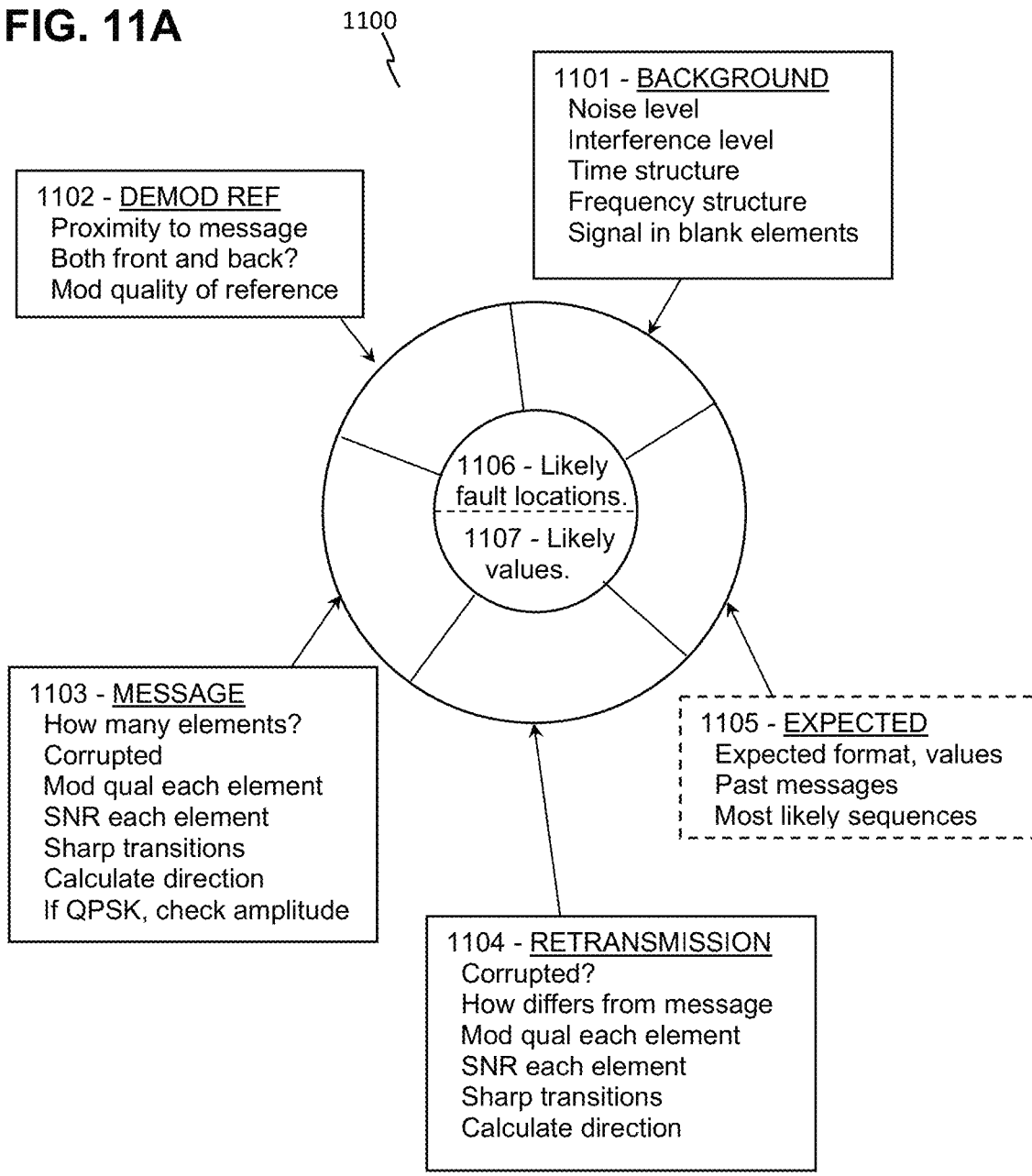
FIG. 11A is a schematic showing an exemplary embodiment of input parameters related to detecting and correcting message faults, according to some embodiments.

FIG. 11A is a schematic showing an exemplary embodiment of input parameters related to detecting and correcting message faults, according to some embodiments. As depicted in this non-limiting example, the input parameters 1100 of an AI model, configured for determining which message elements 1106 of a received message are likely faulted, and optionally their most probable values 1107, may include background parameters 1101, demodulation reference parameters 1102, message signal parameters 1103, properties of a retransmitted copy (if any) 1104, and optionally the parameters that the receiver may expect or anticipate in the message 1105, among other inputs.

The background parameters 1101 may include a noise level, which in this context is generally related to random electronic noise in the transmitter or receiver, and may be well-characterized in advance. An interference level, often due to message transmissions from neighboring cells, may be determined by measuring narrow-band bursty signals other than received messages. In addition, signals resembling noise or interference can be generated by equipment such as switchgear, with usually a complex frequency spectrum and intermittent pulsation. The input parameters may include the measured time structure and/or frequency spectrum of the observed noise plus interference, which may affect how the algorithm separates faulted message elements from unfaulted ones. In addition, the receiver can evaluate the background by measuring the received energy during a blank resource element, not containing uplink or downlink transmissions from within the receiver's cell. For example, the receiver can detect a blank resource element as having signals with an amplitude substantially lower than the lowest amplitude modulation level of the modulation scheme. Any activity detected in a blank resource element may be ascribed to noise or interference.

The demodulation reference parameters 1102 may include parameters of the demodulation reference (its size and type for example), how close the demodulation reference is to the message (in time and frequency), and whether there are two (or more) demodulation references placed before and after the message. The presence of at least one demodulation reference proximate to the message may be important because noise or interference may distort the reference elements of the demodulation reference in the same way, or a similar way, as the message elements. When the amplitude and phase levels of the demodulation reference are then used to demodulate the message elements, those distortions may cancel, thereby mitigating the noise or interference. Another parameter may be the modulation quality of the reference elements, determined for example by comparing a received demodulation reference to prior versions. A sufficiently distorted demodulation reference may cause all of the message elements to appear to be faulted, when in fact the message is correct and it is the demodulation reference that is faulted.

The message parameters 1103 may include the size and modulation of the message, the modulation quality and SNR of each element, the amplitude and phase of the sum-signal, and various signal properties. For example, the signal properties may include the modulation quality of each message element, based on the difference between the amplitude of each I-branch or Q-branch signal relative to the closest predetermined amplitude level of the modulation scheme, or the amplitude and phase of the sum-signal relative to the expected values according to a preceding demodulation reference for example, and these parameters may be provided for each message element. The receiver or the algorithm can also calculate a direction corresponding to the message element's modulation relative to the closest state.

The signal properties may include a SNR measurement for each message element, since some types of noise or interference can cause variations in the amplitude of the received signal, which may appear as a reduced SNR for that message element. For example, interference from a moving vehicle can result in a variety of distortions such as a frequency shift (Doppler shift) that, when added to the stationary transmitter's signal, exhibits an oscillation pattern caused by two wave signals of slightly different wavelength. The signal may be received as a fluctuating waveform or a decrease in the SNR of the message element.

The receiver can also measure the "transitions" between sequential modulated resource elements. A transition, in this context, is the brief interval during which the amplitude or phase of the signal changes from one modulation state to the next. The receiver may determine whether the transitions are as sharp as expected. If interference is present due to signals from a distant cell, for example, the transitions may be smeared or widened due to the propagation delay or separate time-base of the second signal.

When the modulation scheme has just a single amplitude level, such as QPSK, the receiver can measure the amplitudes of the received message elements and detect interference if one of the amplitudes is substantially larger or smaller in amplitude than the others. A message element with amplitude significantly different from the others may be suspicious.

If a retransmission of the same message has been received, the input parameters may further include the parameters of the retransmitted message 1104, which may include the same parameters as mentioned for the originally received message, and/or additional parameters such as inconsistencies between the two copies. Comparison between the two copies may further expose faulted message elements. If a message element in one of the copies has substantially greater modulation quality or SNR than the corresponding element of the other copy, then the one with lower quality is likely faulted.

The input parameters may further include parameters that the receiver may be expecting 1105 based on foreknowledge. The receiver may be expected a particular type or format or content, for example. The receiver may base the expectation on a requested response, or on past messages received, or other criteria. For example, a user device such as a timer may receive certain standard messages repeatedly, such as "start", "stop", and "report". If a received message resembles one of those types but has one message element deviating from the expected format, such as "repoXt" instead of "report", then the deviating message element may be faulted. Comparison of received messages with prior similar messages, or with a set of predetermined formats, may thereby indicate faulted message elements.

The AI model, or an algorithm derived from it, may take the above listed parameters, and other parameters, as input, and indicate which message elements of a message are likely faulted, and optionally may suggest possible corrected values for those faulted message elements.

Figure 11B:
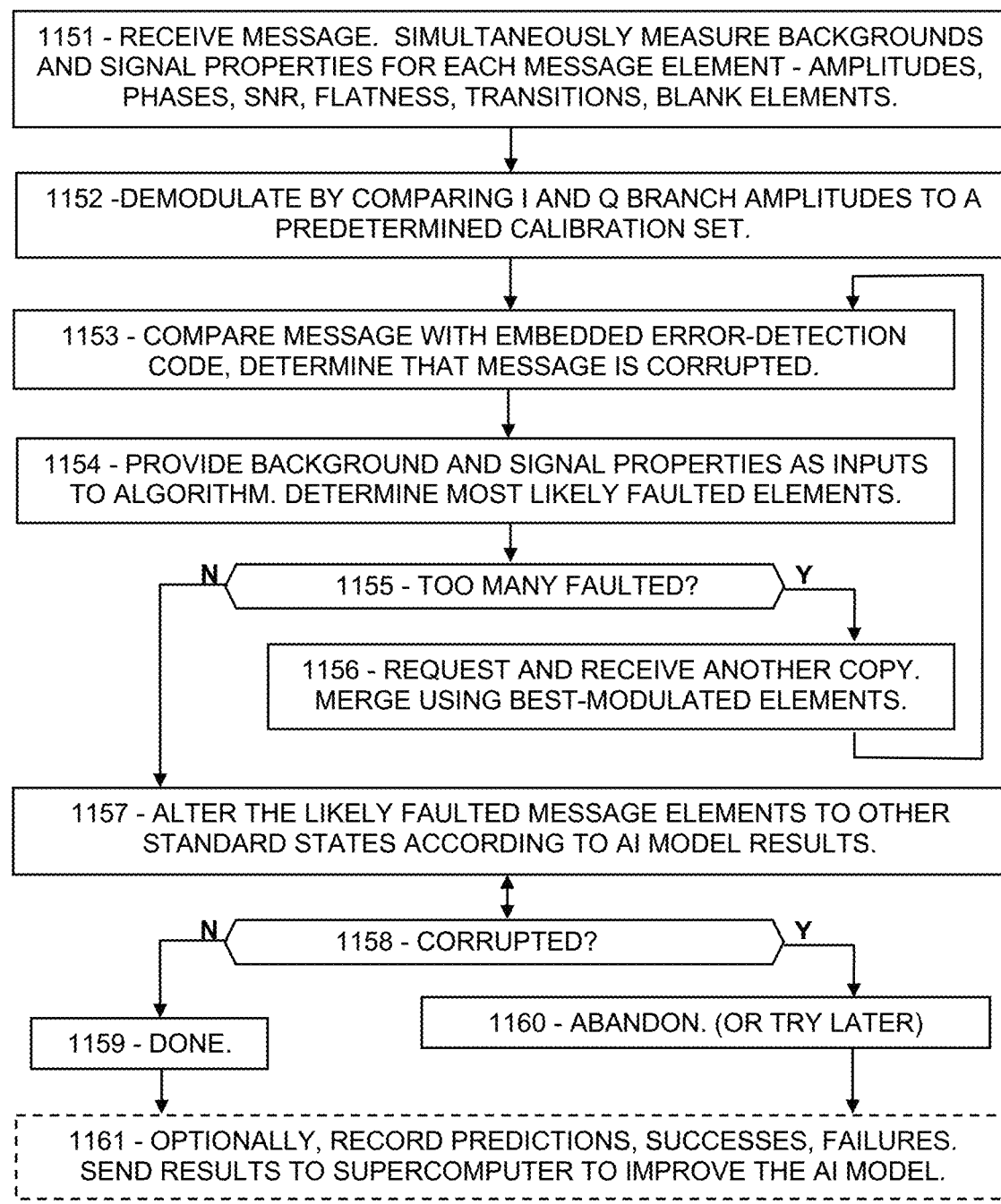
FIG. 11B is a flowchart showing an exemplary embodiment of a procedure for a receiver to use an AI algorithm, according to some embodiments.

FIG. 11B is a flowchart showing an exemplary embodiment of a procedure for a receiver to use an AI algorithm, according to some embodiments. As depicted in this non-limiting example, at 1151 the receiver receives a message, and may measure signal parameters while receiving the message, such as the modulation quality or SNR or amplitude flatness or transition sharpness for example. The receiver may also determine a background noise and interference level by measuring stray signals during blank resource elements proximate to the message. Blank resource elements, with no locally transmitted signal, may permit a direct measure of current noise and interference.

At 1152, the receiver demodulates the message by comparing the I-branch and Q-branch amplitudes of each message element to the levels of a calibration set, previously derived from one or more demodulation references which may be provided before and, preferably, after the message. If two demodulation references are provided fore and aft of the message, a weighted average (such as an interpolation) of the two demodulation references may be used to demodulate each message element, the weighting based on the position of each message element relative to the two demodulation references.

At 1153, the receiver may compare the demodulated message with an embedded error-detection code and thereby determine whether the message is corrupted. In this case, it is corrupted. Therefore, at 1154, the receiver provides the measured data regarding backgrounds and signal properties and so forth, to an algorithm. The algorithm is derived from an AI model, and configured to determine which of the message elements is/are likely faulted, or a quality rating for each message element, or a likelihood that the message element is faulted, for example.

At 1155, the receiver determines whether the number of likely faulted message elements is greater or less than a predetermined maximum. If the number of likely faults is greater than the maximum, then the receiver may conclude that varying the faulted elements is futile and may request a retransmission at 1156. The receiver may then merge the two copies by taking the best message elements from each copy (such as the higher quality modulation or the higher SNR or a combination of these). Then, using the merged version, the receiver may return to 1153 to test the merged version.

If, however, the number of faults is less than the maximum at 1155, then the receiver may attempt a grid search by altering the state assignment of each of the likely faulted message elements at 1157 and testing the altered message against the error-detection code at 1158, continuing through all combinations of the likely faulted message elements, as indicated by a double-ended arrow. For example, the receiver may alter each likely faulted message element by re-assigning to an adjacent state of the modulation scheme in a direction indicated by the algorithm, based on the message element's modulation, and then test that version. If not successful, the receiver may alter the message element among all of the other adjacent states, testing each. If still unsuccessful, the receiver may vary the message element to each of the remaining states to see if any of those agrees with the error-detection code. The receiver may vary each of the likely faulted message elements individually in this manner, or in combination with other likely faulted message elements in a nested grid search, exhaustively covering all possible combinations of assignments for each of the likely faulted message elements, if necessary. If any of those alterations agrees with the error-detection code, the task is done at 1159. If none of the versions is successful, the receiver may abandon the message at 1160, or request a retransmission. If backgrounds are high, the receiver may wait until a later time and request a retransmission at that time. For example, the receiver may monitor the interference level and request the retransmission after the interference has subsided, thereby obtaining a message copy with fewer faulted message elements.

As an option, at 1161, the receiver may record message data, including faults, and optionally including the algorithm predictions of which message elements are likely faulted. The receiver, or other network item, may then transmit that data to the AI model for further refinement of the model.

5G and 6G have enormous potential for communications between user devices base stations, vehicles in traffic, roadside devices, and innumerable other applications for low-cost wireless communication. The systems and methods disclosed herein are intended to provide means for base stations and user devices to detect and correct faulted messages using AI-derived algorithms, and thereby to reduce message failures, interference with other cells, and time lost to retransmissions, thereby improving network operation and customer satisfaction overall.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing medium. The output results may be delivered to a user by way of signals transmitted to robot steering and throttle controls, a video graphics card or integrated graphics chipset coupled to a display that maybe seen by a user. Given this teaching, any number of other tangible output results will also be understood to be contemplated by the invention. For example, output results may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention.

The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A method for a wireless receiver to identify faulted message elements, the method comprising:
   a) receiving a message comprising message elements, each message element comprising a resource element of a resource grid, modulated according to a modulation scheme comprising exactly two modulation parameters, wherein a first modulation parameter is modulated according to a first plurality of predetermined modulation levels and a second modulation parameter is modulated according to a second plurality of predetermined modulation levels;
   b) for each message element, determining a first deviation comprising a difference between a measured value of the first modulation parameter and a closest level of the first plurality of predetermined modulation levels, and determining a second deviation comprising a difference between a measured value of the second modulation parameter and a closest level of the second plurality of predetermined modulation levels; and
   c) determining which message elements are likely faulted according to the first and second deviations.

2. The method of claim 1, wherein the message is received according to at least Fifth Generation (5G) technologies.

3. The method of claim 1, wherein for each message element:
   a) the first modulation parameter comprises an amplitude of an I branch component of the message element, and the first deviation comprises an I-branch deviation; and
   b) the second modulation parameter comprises an amplitude of an orthogonal Q branch component of the message element, and the second deviation comprises a Q-branch deviation.

4. The method of claim 3, further comprising determining that a particular message element is faulted when either:
   a) an I-branch deviation of the particular message element is larger than the I-branch deviation of any other message element in the message; or
   b) a Q-branch deviation of the particular message element is larger than the Q-branch deviation of any other message element in the message.

5. The method of claim 3, further comprising, for each message element, calculating a total deviation comprising a square root of a sum of the I-branch deviation squared plus the Q-branch deviation squared, and determining that a particular message element having a largest total deviation is likely faulted.

6. The method of claim 5, further comprising, for each message element, comparing the total deviation to a predetermined threshold, and determining that the message element is faulted when the total deviation exceeds the predetermined threshold.

7. The method of claim 1, wherein:
   a) the first modulation parameter comprises a phase of each message element, and the first deviation comprises a phase deviation; and
   b) the second modulation parameter comprises an amplitude of each message element, and the second deviation comprises an amplitude deviation.

8. The method of claim 7, further comprising, for each message element:
   a) calculating a total deviation comprising a square root of a sum of the phase deviation squared plus the amplitude deviation squared; and
   b) determining that a particular message element having a largest total deviation is likely faulted.

9. The method of claim 8, further comprising, for each message element:
   a) comparing the total deviation to a predetermined threshold; and
   b) determining that each message element is faulted when the total deviation exceeds the predetermined threshold.

10. The method of claim 1, further comprising:
    a) providing the first and second deviations of each message element as input to an artificial intelligence (AI) model; and
    b) determining, as output from the AI model, which message elements are likely faulted.

11. The method of claim 10, further comprising determining, as further output from the AI model, a likelihood that each message element is faulted.

12. The method of claim 1, further comprising:
    a) altering each likely faulted message element according to the first and second deviations; and
    b) determining whether the message, including the altered message elements, is corrupted.

13. A wireless receiver comprising an artificial intelligence (AI) model, wherein:
    a) the wireless receiver is configured to receive wireless signals comprising message elements, each message element comprising a resource element of a resource grid modulated according to a modulation scheme comprising exactly two multiplexed modulation parameters comprising a first modulation parameter and a second modulation parameter; and
    b) the wireless receiver is further configured to provide, as input to the AI model, as-received values for the first and second modulation parameter of each message element, and to determine, as output from the AI model, which message element is likely faulted.

14. The wireless receiver of claim 13, further configured to provide, as further input to the AI model, predetermined first and second modulation parameter levels according to a demodulation reference proximate to the message elements.

15. The wireless receiver of claim 14, further configured to determine, for each message element:

a) a first deviation comprising a difference between the received value of the first modulation parameter, and a closest parameter level of the predetermined first modulation parameter levels; and b) a second deviation comprising a difference between the received value of the second modulation parameter, and a closest parameter level of the predetermined second modulation parameter levels.

16. The wireless receiver of claim 15, further configured to provide, as further input to the AI model, the first deviation and the second deviation of each message element.

17. Non-transitory computer-readable media in a wireless receiver, the non-transitory computer-readable media containing instructions that, when implemented by a computing environment, cause a method to be performed, the method comprising:

a) receiving a wireless message comprising message elements, each message element comprising a resource element of a resource grid, each message element modulated according to a modulation scheme comprising exactly two multiplexed modulation parameters comprising a first modulation parameter and a second modulation parameter, wherein the first modulation parameter is modulated according to a first plurality of predetermined modulation levels and the second modulation parameter is modulated according to a second plurality of predetermined modulation levels;

b) for each message element, measuring a first received value of the first modulation parameter and a second received value of the second modulation parameter;

c) for each message element, determining a first deviation comprising a difference between the first received value and a closest predetermined modulation level of the first plurality, and determining a second deviation comprising a difference between the second received value and a closest predetermined modulation level of the second plurality;

d) determining, according to the first or second deviation of a particular message element, that the particular message element is likely faulted.

18. The non-transitory computer-readable media of claim 17, wherein the determining that the particular message element is likely faulted comprises:

determining that the first or second deviation of the particular message element is larger in magnitude than the first or second deviation of any other message element of the wireless message.

19. The non-transitory computer-readable media of claim 17, wherein the determining that the particular message element is likely faulted comprises:

a) calculating, for each message element, a total deviation comprising a sum of squares of the first and second deviations, or a square root of that sum; and b) determining which message element has a largest total deviation.

20. The non-transitory computer-readable media of claim 17, wherein the determining that the particular message element is likely faulted comprises:

a) providing, as input to an artificial intelligence (AI) model, the first and second deviations of each message element, and each predetermined modulation level of the first and second pluralities; and b) determining, as output from the AI model, which message element or message elements, is or are likely faulted.

* * * * *